(12) United States Patent
Kurazumi et al.

(10) Patent No.: US 7,968,652 B2
(45) Date of Patent: Jun. 28, 2011

(54) MODIFIED CONJUGATED DIENE COPOLYMER, RUBBER COMPOSITIONS AND TIRES

(75) Inventors: Junko Kurazumi, Tokyo (JP); Eiju Suzuki, Tokyo (JP); Yoichi Ozawa, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 803 days.

(21) Appl. No.: 11/911,592

(22) PCT Filed: Apr. 17, 2006

(86) PCT No.: PCT/JP2006/308086
§ 371 (c)(1),
(2), (4) Date: Jan. 18, 2008

(87) PCT Pub. No.: WO2006/112450
PCT Pub. Date: Oct. 26, 2006

(65) Prior Publication Data
US 2009/0292043 A1    Nov. 26, 2009

(30) Foreign Application Priority Data

Apr. 15, 2005  (JP) .................................. 2005-118790
Apr. 19, 2005  (JP) .................................. 2005-121184

(51) Int. Cl.
*C08C 19/22* (2006.01)
*C08F 36/04* (2006.01)

(52) U.S. Cl. ........ 525/351; 525/352; 525/379; 525/342; 525/383; 525/332.8; 525/333.1; 525/333.2

(58) Field of Classification Search .................. 525/351, 525/352, 379, 342, 383, 332.8, 333.1, 333.2
See application file for complete search history.

(56) References Cited

U.S. PATENT DOCUMENTS

| | | | | |
|---|---|---|---|---|
| 5,844,050 A * | 12/1998 | Fukahori et al. | ............... | 525/351 |
| 6,977,281 B1 * | 12/2005 | Ozawa et al. | ................. | 525/377 |
| 2005/0070672 A1 * | 3/2005 | Ozawa et al. | ............. | 525/331.9 |
| 2006/0287433 A1 * | 12/2006 | Kanae et al. | ................. | 525/191 |

FOREIGN PATENT DOCUMENTS

| | | |
|---|---|---|
| EP | 0 713 885 A1 | 5/1996 |
| EP | 1 099 711 A2 | 5/2001 |
| EP | 1 099 711 A3 | 9/2001 |
| EP | 1 449 857 A1 | 8/2004 |
| JP | 5-51406 A | 3/1993 |
| JP | 5-59103 A | 3/1993 |
| JP | 2000-86814 A | 3/2000 |
| JP | 2000-212213 A | 8/2000 |
| JP | 2001-40001 A | 2/2001 |
| JP | 2001-98015 A | 4/2001 |
| JP | 2001-139633 A | 5/2001 |
| JP | 2003-514079 A | 4/2003 |
| WO | WO 95/04090 A1 | 2/1995 |

\* cited by examiner

*Primary Examiner* — Ling-Siu Choi
(74) *Attorney, Agent, or Firm* — Sughrue Mion, PLLC

(57) ABSTRACT

The present invention provides a modified conjugated diene polymer that is prepared by polymerization of a conjugated diene compound using a catalyst containing a lanthanoid rare earth element compound in an organic solvent and then modifying the resulting polymer having an active organic metal site with a modifier, wherein the modification efficiency is not less than 15% and the cis-1,4 bond content in the conjugated diene moiety measured by Fourier transform infrared spectroscopy satisfies the relationship (I):

$$\text{cis-1,4 bond content} \geq 98.00(\%) \tag{I},$$

or the modification efficiency is not less than 75% and the cis-1,4 bond content in the conjugated diene moiety measured by Fourier transform infrared spectroscopy satisfies the relationship (II):

$$94.00(\%) \leq \text{cis-1,4 bond content} < 98.00(\%) \tag{II}.$$

The invention further provides a rubber composition containing the modified conjugated diene polymer and giving a tire exhibiting low heat build-up, satisfactory failure characteristics, and high abrasion resistance, and a tire composed of the rubber composition and exhibiting these characteristics.

32 Claims, 1 Drawing Sheet

US 7,968,652 B2

MODIFIED CONJUGATED DIENE COPOLYMER, RUBBER COMPOSITIONS AND TIRES

TECHNICAL FIELD

The present invention relates to a modified conjugated diene polymer, a rubber composition, and a tire. In particular, the present invention relates to a modified conjugated diene polymer that is effectively modified with a specific compound containing a lanthanoid rare earth compound and interacting with carbon black, silica, and other inorganic fillers and has a high cis-1,4 bond content and a high terminal modification efficiency, a rubber composition that contains the modified conjugated diene polymer, can give tires exhibiting low heat build-up and excellent failure characteristics and abrasion resistance, and exhibits high factory workability, and a tire comprising the rubber composition and having the characteristics described above.

BACKGROUND ART

In recent years, requests for fuel-efficient vehicles have been more severe in association with global regulation of carbon dioxide emission in response to social needs of energy saving and growing interest in environmental issues. In order to meet such requests, tires exhibiting low rolling resistance are needed. Although optimization of the tire structure has been studied as a mean that decreases the rolling resistance of tires, the most typical means is to use materials exhibiting lower heat-buildup in rubber compositions.

High cis-1,4-polybutadiene that is prepared by polymerization using a catalyst containing a lanthanoid rare earth element is used as one of the rubber components in the rubber composition because it is a linear polymer generally having a small number of branched structures, has a higher cis content than conventional high-cis polybutadienes prepared by polymerization using a catalyst primarily containing cobalt, nickel, or titanium, and exhibits high abrasion resistance, heat-buildup resistance, and fatigue resistance.

Furthermore, studies to increase the cis content of the polybutadiene have been continuously conducted. For example, it is known that polymerization of butadiene using a catalyst system composed of a metallocene complex of a gadolinium compound gives a conjugated diene polymer having a significantly high cis-1,4 bond content. Unfortunately, since this polymer having a cis-1,4 bond content has a significantly narrow molecular weight distribution of 1.5 or less, rubber compositions containing this polymer exhibit poor workability and kneading characteristics, resulting in unsatisfactory mechanical properties (for example, refer to Nonpatent Document 1).

On the other hand, in order to formulate rubber compositions having low heat build-up, many techniques have been developed to enhance dispersion of fillers used in rubber compositions. Among them, the most typical method in a recent trend is modification of the polymerization active end of a diene polymer prepared by anionic polymerization using an organic lithium compound with a functional group that can interact with fillers.

For example, disclosed are a combination of use of carbon black as a filler and modification of polymerization active ends using a tin compound (for example, refer to Patent Document 1) and a combination of use of carbon black and introduction of amino groups into polymerization active ends (for example, refer to Patent Document 2).

Also, it is known that living polymers can be prepared by coordination polymerization using a catalyst containing a lanthanoid rare earth compound, and modification of the resulting polymers with specific coupling agents or modifiers are investigated (for example, refer to Patent Documents 3 to 5).

However, living ends generated using catalyst containing known lanthanoid rare earth compounds have low activity, that is, the terminal modification efficiency is several tens of percent at most, although techniques achieving a terminal modification efficiency of less than 75% have been disclosed recently (for example, refer to Patent Document 6). Although several examples of polymerization with high living characteristics have been reported, no example achieves compatibility of a high degree of microstructure control and a high conversion rate. These techniques can achieve the objects described above to some extent; however, a further improvement is awaited for achieving low fuel consumption required in the market.

[Patent Document 1] Japanese Examined Patent Application Publication No. 5-87530
[Patent Document 2] Japanese Unexamined Patent Application Publication No. 62-207342
[Patent Document 3] Japanese Unexamined Patent Application Publication No. 63-178102
[Patent Document 4] Japanese Unexamined Patent Application Publication No. 5-59103
[Patent Document 5] Japanese Unexamined Patent Application Publication No. 63-297403
[Patent Document 6] WO 95/04090
[Nonpatent Document 1] Macromol. Rapid Commun. 2003, Vol. 24, pp. 179-184

DISCLOSURE OF INVENTION

An object of the present invention is to provide a modified conjugated diene polymer that is prepared by modifying an terminally active polymer prepared using a catalyst containing a lanthanoid rare earth element compound, has a significantly high cis-1,4 bond content and a terminal modification efficiency of a specific value or more, or a modified conjugated diene polymer having a significantly high terminal modification efficiency and a specific range of cis-1,4 bond content. Another object of the invention is to provide a rubber composition that comprises the modified conjugated diene polymer, and can give a tire exhibiting low heat build-up, excellent failure characteristics, and high abrasion resistance, and a tire comprising the rubber composition and exhibiting these characteristics.

As a result of intensive study in order to achieve the objects, the inventors discovered that a rubber composition comprising a modified conjugated diene polymer prepared by modification of a polymer with a specific modifier, the polymer being prepared by polymerization of a conjugated diene compound using a catalyst containing a lanthanoid rare earth metal compound in an organic solvent and having an active organic metal site, the modified conjugated diene polymer having a modification efficiency of a specific value or more and a significantly high cis-1,4 content in the conjugated diene moiety of a specific value or more according to a specific measuring method, or having a significantly high modification efficiency of a specific value or more, a specific range of cis-1,4 content in the conjugated diene moiety according to a specific measuring method, the modified conjugated diene polymer highly interacting with carbon black and inorganic fillers and having a specific molecular weight distribution, exhibits excellent factory workability and gives a tire exhibiting low heat build-up and excellent failure characteristics and abrasion resistance. The present invention was completed under such finding.

The present invention provides the following Aspects;

(1) A modified conjugated diene polymer that is prepared by polymerization of a conjugated diene compound using a catalyst containing a lanthanoid rare earth element compound in an organic solvent and then modifying the resulting polymer having an active organic metal site with a modifier, wherein the modification efficiency is not less than 15% and the cis-1,4 bond content in the conjugated diene moiety measured by Fourier transform infrared spectroscopy satisfies the relationship (I):

cis-1,4 bond content≧98.00(%)　　(I), or the modification efficiency is not less than 75% and the cis-1,4 bond content in the conjugated diene moiety measured by Fourier transform infrared spectroscopy satisfies the relationship (II):

94.00(%)≦cis-1,4 bond content<98.00(%)　　(II).

(2) The modified conjugated diene polymer according to Aspect (1), wherein in the modified polymer prepared by modification of the polymer having the active organic metal site, the modification efficiency is not less than 40% and the cis-1,4 bond content in the conjugated diene moiety measured by Fourier transform infrared spectroscopy satisfies the relationship (I):

cis-1,4 bond content≧98.00(%)　　(I), or the modification efficiency is not less than 75% and the cis-1,4 bond content in the conjugated diene moiety measured by Fourier transform infrared spectroscopy satisfies the relationship (II):

94.00(%)≦cis-1,4 bond content<98.00(%)　　(II).

(3) The modified conjugated diene polymer according to Aspect (1) or Aspect (2), wherein in the modified polymer prepared by modification of the polymer having the active organic metal site, the modification efficiency is not less than 40% and the cis-1,4 bond content in the conjugated diene moiety measured by Fourier transform infrared spectroscopy satisfies the relationships (I) and (III):

cis-1,4 bond content≧98.00(%)　　(I), vinyl bond content≦0.75×(cis-1,4 bond content)−73.25(%)　　(III), or the modification efficiency is not less than 75% and the cis-1,4 bond content in the conjugated diene moiety measured by Fourier transform infrared spectroscopy satisfies the relationship (II):

94.00(%)≦cis-1,4 bond content<98.00(%)　　(II).

(4) The modified conjugated diene polymer according to any one of Aspects (1) to (3), wherein the microstructure measured by the Fourier transform infrared spectroscopy satisfies the relationships (I) and (IV):

cis-1,4 bond content≧98.00(%)　　(I), vinyl bond content≦0.35　　(IV).

(5) The modified conjugated diene polymer according to any one of Aspects (1) to (4), wherein the polymer having the active organic metal site is a terminally active polymer.

(6) The modified conjugated diene polymer according to any one of Aspects (1) to (5), wherein the polymer having the active organic metal site is allowed to react with a compound (modifier) having a functional group capable of substitution or addition reaction with the active organic metal site and not containing an active proton that deactivates the active organic metal site, thereby the functional group is incorporated or the molecular weight is increased by coupling.

(7) The modified conjugated diene polymer according to Aspect (6), wherein the modifier has at least one functional group selected from the group consisting of an azacyclopropane group, ketone groups, carboxyl groups, thiocarboxyl groups, carbonates, carboxylic anhydrides, carboxylic acid metal salts, acid halides, urea groups, thiourea groups, amido groups, thioamido groups, isocyanate groups, thioisocyanate groups, haloisocyano groups, epoxy groups, thioepoxy groups, imino groups, and a M-Z bond (where M is Sn, Si, Ge, or P, and Z is a halogen atom) and contains no active proton nor onium salt that deactivates the active organic metal site.

(8) The modified conjugated diene polymer according to Aspect (6) or (7), wherein the modifier is at least one compound (a) represented by the general formula (V):

[Chemical Formula 1]

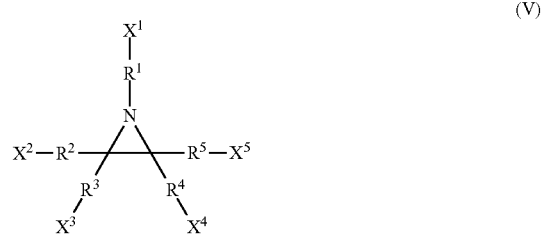

where $X^1$ to $X^5$ each represent a monovalent functional group containing at least one selected from the group consisting of a hydrogen or halogen atom, carbonyl groups, thiocarbonyl groups, isocyanate groups, thioisocyanate groups, epoxy groups, thioepoxy groups, halosilyl groups, hydrocarbyloxysilyl groups, and sulfonyloxy groups, and containing no active proton nor onium salt; $X^1$ to $X^5$ may be the same or different with provizo that at least one of $X^1$ to $X^5$ is not a hydrogen atom; $R^1$ to $R^5$ independently represent a single bond or a divalent hydrocarbon group having 1 to 18 carbon atoms; and a plurality of aziridine rings may be bonded via any of $X^1$ to $X^5$ and $R^1$ to $R^5$.

(9) The modified conjugated diene polymer according to Aspect (8), wherein the compound (a) does not simultaneously satisfy $X^1$=hydrogen atom and $R^1$=single bond in the general formula (V).

(10) The modified conjugated diene polymer according to any one of Aspects (1) to (7), wherein the modifier is at least one selected from the following compounds (b) to (h):

compound (b): a halogenated organic metal compound, metal halide compound, or organic metal compound represented by $R^6nM'Z_{4-n}$, $M'Z_4$, $M'Z_3$, $R^7nM'(—R^8—COOR^9)_{4-n}$, or $R^7nM'(—R^8—COR^9)_{4-n}$, where $R^6$ to $R^8$ may be the same or different and are each a hydrocarbon group containing 1 to 20 carbon atoms; $R^9$ is a hydrocarbon group containing 1 to 20 carbon atoms and optionally containing a carbonyl or ester group on a side chain; M' is a tin, silicon, germanium, or phosphorus atom; Z is a halogen atom; and n is an integer of 0 to 3;

compound (c): a heterocumulene compound containing a Y=C=Y' bond (where Y is a carbon, oxygen, nitrogen, or sulfur atom; and Y' is an oxygen, nitrogen, or sulfur atom) in the molecule;

compound (d): a heterotricyclic compound having a bond represented by the general formula (VI):

[Chemical Formula 2]

(VI)

(where Y' is an oxygen or sulfur atom) in the molecule;
compound (e); a haloisocyano compound;
compound (f): a carboxylic acid, acid halide, ester, carbonic ester, or acid anhydride represented by $R^{10}$—(COOH)m, $R^{11}$(COZ)m, $R^{12}$—(COO—$R^{13}$), $R^{14}$—OCOO—$R^{15}$, $R^{16}$—(COOCO—$R^{17}$) general formula (VII):

[Chemical Formula 3]

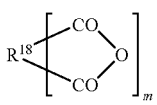

(VII)

(where $R^{10}$ to $R^{18}$ may be the same or different and are each a hydrocarbon group containing 1 to 50 carbon atoms; Z is a halogen atom; and m is an integer of 1 to 5;
compound (g): a carboxylic acid metal salt represented by $R^{19}_k M''(OCOR^2)_{4-k}$, $R^{21}_k M''(OCO—R^{22}—COOR^{23})_{4-k}$, or general formula (VIII):

[Chemical Formula 4]

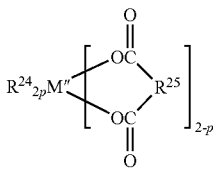

(VIII)

(where $R^{19}$ to $R^{25}$ may be the same or different and are each a hydrocarbon group containing 1 to 20 carbon atoms; M'' is a tin, silicon, or germanium atom; and k is an integer of 0 to 3); and
compound (h): an N-substituted aminoketone, an N-substituted aminothioketone, an N-substituted aminoaldehyde, an N-substituted aminothioaldehyde, or a compound having a —C-(=M)-N< bond (M represents an oxygen or sulfur atom) in the molecule.

(11) The modified conjugated diene polymer according to any one of Aspects (1) to (7), wherein the modifier (i) is at least one selected from hydrocarbyloxysilane compounds represented by the general formula (IX):

[Chemical Formula 5]

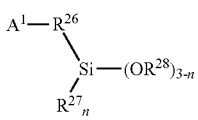

(IX)

[where $A^1$ is a monovalent group having at least one functional group selected from the group consisting of (thio) epoxies, (thio)isocyanates, (thio)ketones, (thio)aldehydes, imines, amides, trihydrocarbyl isocyanurate esters, (thio)carboxylic esters, alkali metal salts or alkaline earth metal salts of (thio)carboxylic esters, carboxylic anhydrides, carboxylic halides, and dihydrocarbyl carbonate esters; $R^{26}$ (is a single bond or a divalent inactive hydrocarbon group; $R^{27}$ and $R^{28}$ independently represent a monovalent aliphatic hydrocarbon group having 1 to 20 carbon atoms or a monovalent aromatic hydrocarbon group having 6 to 18 carbon atoms; n is an integer of 0 to 2; if a plurality of $OR^{28}$'s are present, $OR^{28}$'s may be the same or different; and an active proton or onium salt is not contained in the molecule] and partial condensates thereof.

(12) The modified conjugated diene polymer according to Aspect (11), where the modifier (i) comprises a hydrocarbyloxysilane compound represented by the general formula (IX) and a hydrocarbyloxysilane compound represented by the general formula (X):

[Chemical Formula 6]

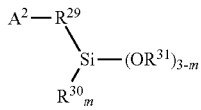

(X)

[where $A^2$ is a monovalent group having at least one functional group selected from cyclic tertiary amines, acyclic tertiary amines, pyridine, sulfides, multisulfides, and nitriles; $R^{29}$ is a single bond or a divalent inactive hydrocarbon group; $R^{30}$ and $R^{31}$ independently represent a monovalent aliphatic hydrocarbon group having 1 to 20 carbon atoms or a monovalent aromatic hydrocarbon group having 6 to 18 carbon atoms; m is an integer of 0 to 2; if a plurality of $OR^{31}$'s are present, $OR^{31}$'s may be the same or different; and an active proton or onium salt is not contained in the molecule] and/or a partial condensate thereof.

(13) The modified conjugated diene polymer according to Aspect (11) or (12), prepared by adding a condensation promoter during and/or after the first modification reaction with the hydrocarbyloxysilane compound of the modifier (i).

(14) The modified conjugated diene polymer according to any one of Aspects (11) to (13), wherein after the first modification of the active end with the hydrocarbyloxysilane compound I represented by the general formula (IX), the diene polymer is further allowed to react with another hydrocarbyloxysilane compound II comprising at least one selected from a hydrocarbyloxysilane compound represented by the general formula (X) and/or a partial condensate thereof and a hydrocarbyloxysilane compound represented by the general formula (XI):

[Chemical Formula 7]

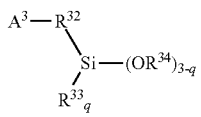

(XI)

[where $A^3$ is a monovalent group having at least one functional group selected from the group consisting of alcohols, thiols, primary amines and onium salts thereof, cyclic secondary amines and onium salts thereof, acyclic secondary amines and onium salts thereof, onium salts of cyclic tertiary amines, onium salts of acyclic tertiary amines, a group having an allyl or benzyl Sn bond, sulfonyl, sulfinyl, and nitrile; $R^{32}$ is a single bond or a divalent inactive hydrocarbon group; $R^{33}$ and $R^{34}$ independently represent a monovalent aliphatic hydrocarbon group having 1 to 20 carbon atoms or a monovalent aromatic hydrocarbon group having 6 to 18 carbon atoms; q is an integer of 0 to 2; and if a plurality of $O^{34}$'s are present, $OR^{34}$'s may be the same or different] and/or a partial condensate thereof in the presence of a condensation promoter.

(15) The modified conjugated diene polymer according to Aspect (14), wherein the condensation promoter comprises water and at least one compound selected from the group consisting of metal compounds represented by following items (1) to (3):

(1) a tin(II) carboxylate having 3 to 30 carbon atoms $$Sn(OCOR^{35})_2$$

[where $R^{35}$'s are each an organic group having 2 to 19 carbon atoms and may be the same or different], (2) a tin(IV) compound represented by the following formula:

$$R^{36}{}_r SnA^4{}_t B^1{}_{(4-t-r)}$$

[where r is an integer of 1 to 3; t is an integer of 1 or 2; t+r is an integer of 3 or 4; $R^{36}$ is an aliphatic hydrocarbon group having 1 to 30 carbon atoms, $B^1$ is a hydroxyl group or halogen atom; $A^4$ is a siloxy group that is tri-substituted in total by [1] a carboxyl group having 2 to 30 carbon atoms, [2] an α,γ-dionyl group having 5 to 30 carbon atoms, [3] a hydrocarbyloxy group having 3 to 30 carbon atoms, and [4] a hydrocarbyl group having 1 to 20 carbons and/or a hydrocarbyloxy group having 1 to 20 carbons (may be the same or different); if a plurality of $A^4$'s are present, $A^4$'s may be the same or different], (3) a titanium(IV) compound represented by the following formula:

$$A^5{}_x TiB^2{}_{(4-x)}$$

[where x is an integer of 2 or 4; $A^5$ is [1] a hydrocarbyloxy group having 3 to 30 carbon atoms, [2] a siloxy group that is tri-substituted in total by an alkyl group having 1 to 30 carbon atoms and/or a hydrocarbyloxy group having 1 to 20 carbons; if a plurality of $A^5$'s are present, $A^5$'s may be the same or different; and $B^2$ is an α,γ-dionyl group having 5 to 30 carbon atoms].

(16) The diene polymer according to any one of Aspects (1) to (7), wherein the modifier (j) is at least one selected from compounds represented by the general formula (XII) or (XIII):

[Chemical Formula 8]

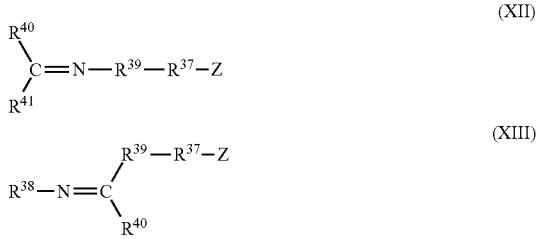

where Z is a substituent to react or interact with an organic or inorganic filler; $R^{37}$ is a single bond or a divalent organic group; $R^{38}$ is a monovalent organic group or a divalent organic group that forms a cyclic organic group together with $R^{39}$ or $R^{40}$; $R^{39}$ is a single bond, a divalent organic group, or a trivalent organic group that forms a cyclic organic group together with $R^{38}$, $R^{40}$, or $R^{41}$; $R^{40}$ is a monovalent organic group or a divalent organic group that forms a cyclic organic group together with $R^{38}$, $R^{39}$, or $R^{41}$; and $R^{41}$ is a monovalent organic group or a divalent organic group that forms a cyclic organic group together with $R^{38}$, $R^{39}$, or $R^{40}$, with the provision that each group bonded to the imino carbon is bonded via a carbon atom and $R^{37}$, $R^{38}$, $R^{39}$, $R^{40}$, $R^{41}$, and Z is a substituent that does not protonate a living polymer.

(17) The modified conjugated diene polymer according to Aspect (16), wherein Z is an N,N-disubstituted aminophenyl group, imino group, or cyclic amino group.

(18) The modified conjugated diene polymer according to Aspect (16) or (17), wherein the modifier (j) comprises dimethylaminobenzylidene ethylamine or diethylaminobenzylidene butylamine; dimethylaminobenzylidene aniline, dimethylaminobenzylidene n-butylaniline, dimethylaminobenzylidene dodecylaniline, dimethylaminobenzylidene metoxyaniline, dimethylaminobenzylidene dimethylaminoaniline, bis(dimethylaminophenyl)methylidene butylamine, bis(dimethylaminophenyl)methylidene n-octylamine, bis(diethylaminophenyl)methylidene butylamine, bis(diethylaminophenyl)methylidene n-octylamine, benzylidene dimethylamincaniline, methoxybenzylidene dimethylaminoaniline, 1-methyl-4-penten-2-yl-methylidene dimethylaniline, 1,3-dimethylbutylidene dimethylaniline, or a mixture thereof; or phenylene bis(dimethylaminobenzylidene amine); benzylidene (1-hexamethyleneimino)aniline, benzylidene (1-pyrrolidino)aniline, dimethylaminobenzylidene (1-hexamethyleneimino)aniline, dimethylaminobenzylidene (1-pyrrolidino) aniline, (1-hexamethyleneimino)benzylidene aniline, (1-pyrrolidino)benzylidene aniline, benzylidene ((4-n-butyl-1-piperazino)methyl)aniline, benzylidene ((3-(1-methyl)pyrrolidino)methyl)aniline, ((4-n-butyl-1-piperazino)methyl)benzylidene aniline, ((3-(1-methyl)pyrrolidino)methyl)benzylidene aniline, or a mixture thereof.

(19) The modified conjugated diene polymer according to any one of Aspects (1) to (18), prepared by polymerizing a monomer comprising a conjugated diene at a temperature of 25° C. in the presence of a catalyst system comprising:

component (A): a lanthanoid rare earth element compound of atomic number 57 to 71 in the periodic table or a reaction product thereof with a Lewis base, component (B): an organic aluminum compound represented by $AlR^{42}R^{43}R^{44}$ where $R^{42}$ and $R^{43}$ may be the same or different, and are each a hydrocarbon group having 1 to 10 carbon atoms or a hydrogen atom; $R^{44}$ is a hydrocarbon group having 1 to 10 carbon atoms; and $R^{42}$ may be the same or different from $R^{43}$ or $R^{44}$), and component (C): at least one of a Lewis acid, a complex of a metal halide with a Lewis base, and an organic compound containing active halogen.

(20) The modified conjugated diene polymer according to Aspect (19), wherein the lanthanoid rare earth element compound in the component (A) is a neodymium salt soluble in a hydrocarbon solvent.

(21) The modified conjugated diene polymer according to Aspect (20), wherein the lanthanoid rare earth element compound in the component (A) is a neodymium branched carboxylate salt or a reaction product of the salt with a Lewis base.

(22) The modified conjugated diene polymer according to any one of Aspects (19) to (21), wherein the catalyst system further comprises aluminoxane as the component (D).

(23) The modified conjugated diene polymer according to Aspect (22), wherein the catalyst system is preliminarily prepared in the presence of components (A), (B), (C), and (D), and the conjugated diene.
(24) The modified conjugated diene polymer according to any one of Aspects (1) to (23), wherein the ratio (Mw/Mn) of the weight average molecular weight (Mw) to the number average molecular weight (Mn) is in the range of 1.6 to 3.5.
(25) The modified conjugated diene polymer according to any one of Aspects (1) to (24), comprising 80 to 100 mass percent of 1,3-butadiene monomer unit and 20 to 0 mass percent of another monomer unit copolymerizable with 1,3-butadiene.
(26) The modified conjugated diene polymer according to Aspect (25), consisting of the 1,3-butadiene monomer unit
(27) The modified conjugated diene polymer according to any one of Aspects (1) to (26), wherein the number average molecular weight (Mn) is in the range of 100,000 to 500,000.
(28) The modified conjugated diene polymer according to Aspect (27), wherein the number average molecular weight (Mn) is in the range of 150,000 to 300,000.
(29) A rubber composition comprising the modified conjugated diene polymer according to any one of Aspects (1) to (28) in an amount of at least 10 mass percent of the entire rubber component.
(30) The rubber composition according to Aspect (29), further comprising a filler in an amount of at least 10 parts by mass based on 100 parts by mass of rubber component.
(31) The rubber composition according to Aspect (29) or (30), being sulfur-crosslinkable.
(32) A tire comprising the rubber composition according to any one of Aspects (29) to (31).

BEST MODE FOR CARRYING OUT THE INVENTION

Figure 1:
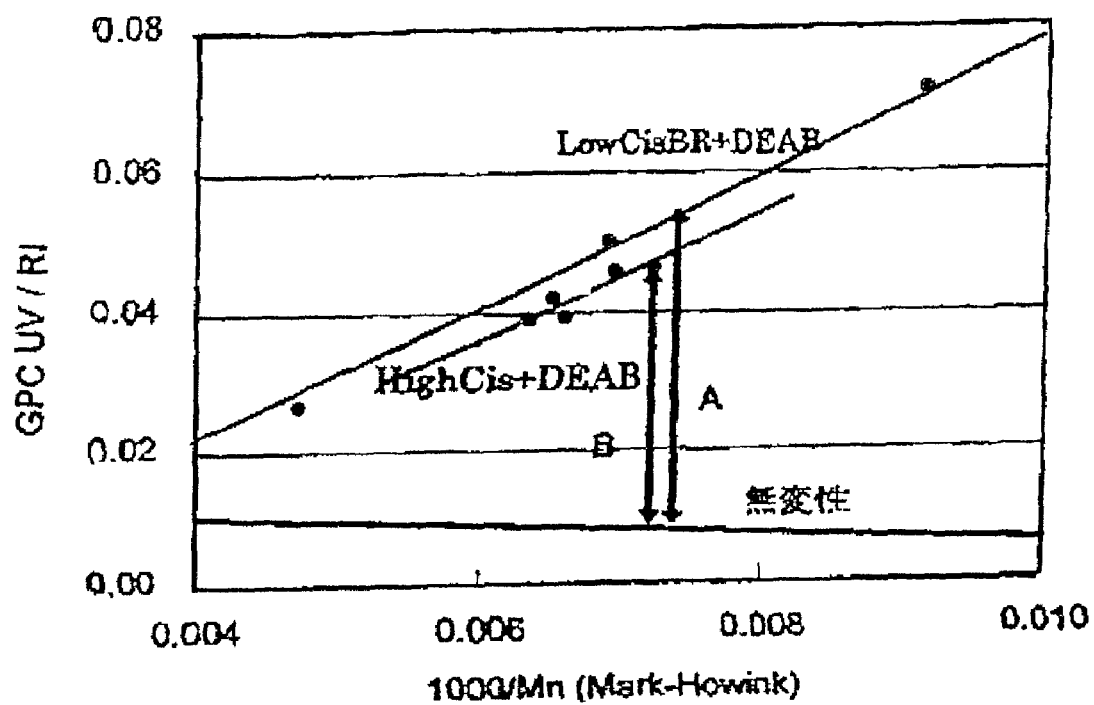
FIG. 1 is a graph of a calibration curve to determine the terminal modification efficiency in an embodiment according to the present invention.

The modified conjugated diene polymer according to the present invention is prepared by modification of a polymer having an active organic metal site with a modifier. The polymer having the active organic metal site is prepared by polymerization of a conjugated diene monomer in an organic solvent using a catalyst containing a lanthanoid rare earth element compound, more specifically, a catalyst containing a specific rare earth compound, an organic aluminum compound, and a halogenated compound, in a low-temperature environment. In this modified polymer, the terminal modification efficiency must be not less than 15%, and the cis-1,4 bond content in the conjugated diene moiety determined by Fourier transform infrared spectroscopy must satisfy the following relationship (I):

$$\text{cis-1,4 bond content} \geq 98.00(\%) \qquad (I)$$

The terminal modification efficiency of the modified conjugated diene polymer of the present invention, which is on the basis of the molar number of the modified groups interactive with carbon black, silica, and other inorganic fillers to the molar number of the polymer molecules, is not less than 15%, preferably not less than 40%, and more preferably not less than 80%. The measurement of the terminal modification efficiency will described below.

The cis-1,4 bond content represented by the relationship (I) of the polymer is not less than 98.0%, and preferably not less than 99%.

Preferably, the modified conjugated diene polymer simultaneously satisfies the relationship (I) and the following relationship (III) on the vinyl bond content:

$$\text{vinyl bond content} \leq 0.75 \times (\text{cis-1,4 bond content}) - 73.25(\%) \qquad (III)$$

More preferably, the polymer simultaneously satisfies the following relationship (IV) on the vinyl bond content:

$$\text{vinyl bond content} \leq 0.35 \qquad (IV)$$

The conjugated diene polymer having a vinyl bond content exceeding 1.7% exhibits low elongation crystallinity, and less contributes to improvement in abrasion resistance, crack resistance, and ozone resistance of rubber compositions. It is believed that vinyl segments, which are bulkier than trans segments, more significantly disturb the crystal structure per segment.

The modified conjugated diene polymer of the invention having a modification efficiency of not less than 15-%, a high cis-1,4 bond content, and a low vinyl bond content, and exhibiting significantly high elongation crystallinity gives a rubber composition and a tire that exhibit low heat build-up, low failure characteristics, high crack resistance, and high abrasion resistance.

Alternatively, the terminal modification efficiency of the modified conjugated diene polymer of the invention must be not less than 75%, and the cis-1,4 bond content in the conjugated diene moiety determined by Fourier transform infrared spectroscopy must satisfy the following relationship (II):

$$94.00(\%) \leq \text{cis-1,4 bond content} < 98.00(\%) \qquad (II)$$

The modified conjugated diene polymer of the invention having a modification efficiency of not less than 75% and preferably not less than 90%, and a cis-1,4 bond content within the range of the relationship (II) also gives a rubber composition and a tire that exhibit low failure characteristics, high abrasion resistance, and particularly low heat build-up.

The cis-1,4 bond content and the vinyl bond content that specify the conjugated diene polymer of the present invention are determined by FT-IR spectroscopy, as follows:
[Microstructure analysis by FT-IR]

The FT-IR transmittance spectrum of the conjugated diene polymer solution in carbon disulfide (5 mg/mL) is measured with a carbon disulfide blank cell. The cis-1,4 bond content, the trans-1,4 content, and the vinyl bond content are determined from the following relationships (XV), (XVI), and (XVII):

$$(\text{cis-1,4 bond content}) = e/(e+f+g) \times 100(\%) \qquad (XV)$$

$$(\text{trans-1,4 content}) = f/(e+f+g) \times 100(\%) \qquad (XVI)$$

$$(\text{vinyl bond content}) = g/(e+f+g) \times 100(\%) \qquad (XVII)$$

where a is a maximum near 1130 cm$^{-1}$, b is a minimum near 967 cm$^{-1}$, c is a minimum near 911 cm$^{-1}$, and d is a minimum near 736 cm$^{-1}$, in the spectrum, and e, f, and g are derived from the following matrix (XIV):

[Equation 1]

$$\begin{bmatrix} 1.7455 & 0 & -0.0151 \\ -0.0454 & 0.4292 & -0.0129 \\ -0.007 & 0 & 0.3746 \end{bmatrix} \begin{bmatrix} \log_{10}(a/d) \\ \log_{10}(a/b) \\ \log_{10}(a/c) \end{bmatrix} = \begin{bmatrix} e \\ f \\ g \end{bmatrix} \qquad (XIV)$$

In the spectrum, the maximum a near 1130 cm$^{-1}$ represents the baseline, the minimum b near 967 cm$^{-1}$ represents trans- 1,4 bond, the minimum c near 911 cm$^{-1}$ represents vinyl bond, and the minimum d near 736 cm$^{-1}$ represents cis-1,4 bond content On traditional analysis of the microstructure of the monomer units in the modified conjugated diene polymer, the cis-1,4 bond content, trans-1,4 content, and the vinyl bond content have been determined by $^1$H-NMR and $^{13}$C-NMR. The $^{13}$C-NMR spectroscopy underestimates the vinyl bond content compared to the actual content. Since the conjugated diene polymer of the invention is characterized by a significantly high cis-1,4 bond content and an extremely low vinyl bond content, the vinyl bond content is determined by FT-IR spectroscopy, which enables high-precision determination of the vinyl bond content.

[Terminal Modification Efficiency]

The terminal modification efficiency is described in detail with reference to FIG. 1.

The vertical axis indicates the UV/RI ratio determined by gel permeation chromatography (GPC), where UV represents a peak area due to UV absorption by the modifier reacting with the polymer and RI represents a peak area due to differential refractive index caused by the polymer itself.

The horizontal axis indicates (1/Mn)×10$^3$, where Mn represents the number average molecular weight. In FIG. 1, low-cis BR is prepared by anionic polymerization with a Li catalyst and is modified with a modifier, 4,4'-bis(diethylamino)benzophenone (hereinafter, referred to as DEAB). Three UV/RI ratios having different number average molecular weights Mn are plotted and can be approximated by a straight line. Since an anionically polymerized polymer can be completely modified (100%), the UV/RI of the low-cis BR is represented by A (100%) as follows:

UV(Li—Br)/RI(Li—Br)=A

Furthermore, five high-cis BR having different number average molecular weights Mn, which are prepared by coordination polymerization using a catalyst containing lanthanoid rare earth metal (Nd) compound and are modified with DEAB, are plotted and can be approximated by a straight line. Since living characteristics are partly lost during the coordination polymerization, the polymer cannot be completely modified. The terminal modification in the present invention is defined as follows:

terminal modification efficiency=B/A×100(%)

where B is the UV/RI ratio of this High C is BR represented by the following relationship:

UV(Nd-Er)/RI(Nd—Br)=B

The terminal modification efficiency of the present invention can be calculated from the values A and B that are determined using low-cis BR having the same number average molecular weight as that of the high-cis BR.

The true UV/RI ratio is calculated by subtracting a value on the line of the unmodified polymer treated with isopropyl alcohol shown in FIG. 1 in which the terminal modification efficiency of this polymer is set to 0%. The values A and B are shown in FIG. 1.

The three straight lines shown in FIG. 1 can be used as calibration curves. For example, if the number average molecular weight Mn of High C is BR is known, the terminal modification efficiency according to the present invention can be calculated.

FIG. 1 shows that the terminal modification efficiency decreases as the number average molecular weight Mn increases, indicating less modification by the modifier.

These calibration curves must be prepared for each modifier.

[Modifier]

The modifier used in the invention has a functional group capable of substitution reaction or addition reaction with the active organic metal site of the polymer, and does not contain an active proton that deactivates the active organic metal site. The functional group is incorporated into the polymer by the reaction with the modifier, or the molecular weight of the polymer is increased by coupling.

Preferably, a typical modifier contains at least one functional group selected from the group consisting of an azacyclopropane group, ketone groups, carboxyl groups, thiocarboxyl groups, carbonates, carboxylic anhydrides, carboxylic acid metal salts, acid halides, urea groups, thiourea groups, amido groups, thioamido groups, isocyanate groups, thioisocyanate groups, halogenated isocyano groups, epoxy groups, thioepoxy groups, imino groups, and M-Z bonds (where M is Sn, Si, Ge, or P, and Z is a halogen atom), but does not contain an active proton or an onium salt that deactivates the active organic metal site.

The modifier components (a) to (j) used in the present invention is now described in detail.

The component (a) allowed to react with the active organic metal site of the polymer in the invention is a modifier represented by the general formula (V):

[Chemical Formula 9]

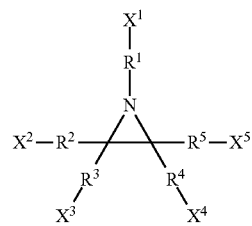

(V)

In the formula (V), $X^1$ to $X^5$ are each a monovalent functional group containing at least one selected from the group consisting of a hydrogen or halogen atom, carbonyl groups, thiocarbonyl groups, isocyanate groups, thioisocyanate groups, epoxy groups, thioepoxy groups, halosilyl groups, hydrocarbyloxysilyl groups, and sulfonyloxy groups and not containing an active proton or onium salt; $X^1$ to $X^5$ may be the same or different with the provizo that at least one of them is not a hydrogen atom.

$R^1$ to $R^5$ each independently represents a single bond or a divalent hydrocarbon group having 1 to 18 carbon atoms. Examples of the divalent hydrocarbon group include C1 to C18 alkylene groups, C2 to C18 alkenylene groups, C6 to C18 arylene groups, C7 to C18 and aralkylene groups. Among them are preferred C1 to C11 alkylene groups, and particularly C1 to C10 alkylene groups. The alkylene groups may be linear, branched, or cyclic. In particular, linear groups are preferred. Examples of the linear alkylene groups include a methylene group, ethylene group, trimethylene group, tetramethylene group, pentamethylene group, hexamethylene group, octamethylene group, and decamethylene group.

Alternatively, a plurality of aziridine rings may be bonded via any of $X^1$ to $X^5$ and $R^1$ to $R^5$.

It is preferred that the modifier do not simultaneously satisfy $X^1$=hydrogen atom and $R^1$=single bond in the general formula (V).

Examples of the modifier represented by the general formula (V) include, but is not limited to, 1-acetylaziridine, 1-propionylaziridine, 1-butyrylaziridine, 1-isobutyrylaziridine, 1-valerylaziridine, 1-isovalerylaziridine, 1-pivaloylaziridine, 1-acetyl-2-methylaziridine, 2-methyl-1-propionylaziridine, 1-butyryl-2-methylaziridine, 2-methyl-1-isobutyrylaziridine, 2-methyl-1-valerylaziridine, 1-isovaleryl-2-methylaziridine, 2-methyl-1-pivaloylaziridine, ethyl 3-(1-aziridinyl)propionate, propyl 3-(1-aziridinyl)propionate, butyl 3-(1-aziridinyl)propionate, ethylene glycol bis[3-(1-aziridinyl)propionate], trimethylolpropane tris[3-(1-aziridinyl)propionate], ethyl 3-(2-methyl-1-aziridinyl)propionate, propyl 3-(2-methyl-1-aziridinyl)propionate, butyl 3-(2-methyl-1 -aziridinyl)propionate, ethylene glycol bis[3-(2-methyl-1-aziridinyl)propionate], trimethylolpropane tris[3-(2-methyl-1-aziridinyl)propionate], neopentyl glycol bis[3-(1-aziridinyl)propionate], neopentyl glycol bis[3-(2-methyl-1-aziridinyl)propionate], di(1-aziridinylcarbonyl)methane, 1,2-di(1-aziridinylcarbonyl)ethane, 1,3-di(1-aziridinylcarbonyl)propane, 1,4-di(1-aziridinylcarbonyl)butane, 1,5-di(1-aziridinylcarbonyl)pentane, di(2-methyl-1-aziridinylcarbonyl)methane, 1,2-di(2-methyl-1-aziridinylcarbonyl)ethane, 1,3-di(2-methyl-1-aziridinylcarbonyl)propane, and 1,4-di(2-methyl-1-aziridinylcarbonyl)butane.

The modifier component (b) reacting with the active organic metal site bonded to the polymer in the present invention is a halogenated organic metal compound or metal halide compound represented by the formula (XVIII):

$$R^{42}{}_nM'Z_{4-n}, M'Z_4, \text{ or } M'Z_3 \qquad (XVIII)$$

where $R^{42}$ is a hydrocarbon group containing 1 to 20 carbon atoms; M' is a tin atom, silicon atom, germanium atom, or phosphorus atom; Z is a halogen atom; n is an integer of 0 to 3. When M' is a tin atom in the formula (XVIII), examples of the component (b) include triphenyltin chloride, tributyltin chloride, triisopropyltin chloride, trihexyltin chloride, trioctyltin chloride, diphenyltin dichloride, dibutyltin dichloride, dihexyltin dichloride, dioctyltin dichloride, phenyltin trichloride, butyltin trichloride, octyltin trichloride, and tin tetrachloride.

When M' is a silicon atom in the formula (XVIII), examples of the component (b) include triphenylchlorosilane, trihexylchlorosilane, trioctylchlorosilane, tributylchlorosilane, trimethylchlorosilane, diphenyldichlorosilane, dihexyldichlorosilane, dioctyldichlorosilane, dibutyldichlorosilane, dimethyldichlorosilane, methyldichlorosilane, phenylchlorosilane, hexyltridichlorosilane, octyltrichlorosilane, butyltrichlorosilane, methyltrichlorosilane, and silicon tetrachloride.

When M' is a germanium atom in the formula (XVIII), examples of the component (b) include triphenylgermanium chloride, dibutylgermanium dichloride, diphenylgermanium dichloride, butylgermanium trichloride, and germanium tetrachloride. When M' is a phosphorus atom in the formula (V), examples of the component (b) include phosphorus trichloride.

In the present invention, the modifier component (b) may be an organic metal compound containing an ester group represented by the following formula (XIX) or a carbonyl group represented by the following formula (XX) in the molecule:

$$R^{43}{}_nM'(-R^{44}-COOR^{45})_{4-n} \qquad (XIX)$$

$$R^{43}{}_nM'(-R^{44}-COR^{45})_{4-n} \qquad (XX)$$

where $R^{43}$ to $R^{44}$ may be the same or different and are each a hydrocarbon group containing 1 to 20 carbon atoms; $R^{45}$ is a hydrocarbon group containing 1 to 20 carbon atoms and may contain a carbonyl or ester group in the side chain; M' is a tin, silicon, germanium, or phosphorus atom; n is an integer of 0 to 3. These compounds may be used in combination in any proportion in the component (b).

In the present invention, the modifier component (C) reactive with the active organic metal site bonded to the polymer is a heterocumulene compound represented by the formula (XXI):

$$Y=C=Y' \text{ bond} \qquad (XXI)$$

where Y is a carbon atom, oxygen atom, nitrogen atom, or sulfur atom, Y' is an oxygen atom, nitrogen atom, or sulfur atom. When Y is a carbon atom and when Y' is an oxygen atom, the component (c) is a ketene compound. When Y is a carbon atom and when Y' is a sulfur atom, the component (c) is a thioketene compound. When Y is a nitrogen atom and when Y' is an oxygen atom, the component (c) is an isocyanate compound. When Y is a nitrogen atom and when Y' is a sulfur atom, the component (c) is a thioisocyanate compound. When both Y and Y' are nitrogen atoms, the component (c) is a carbodiimide compound. When both Y and Y' are oxygen atoms, the component (c) is carbon dioxide. When Y is an oxygen atom and when Y is a sulfur atom, the component (c) is carbonyl sulfide. When both Y and Y' are sulfur atoms, the component (c) is carbon disulfide. The component (c), however, should not be limited to these combinations.

Examples of the ketene compounds include ethylketene, butylketene, pnenylketene, and tolylketene. Examples of the thioketene compounds include ethylene thioketene, butylthioketene, phenylthioketene, and tolylthioketene. Examples of the isocyanate compounds include phenyl isocyanate, 2,4-tolylene diisocyanate, 2,6-tolylene diisocyanate, diphenyl methane diisocyanate, polymeric-type diphenyl methane diisocyanate, and hexamethylene diisocyanate. Examples of the thioisocyanate compounds include phenyl thioisocyanate, 2,4-tolylene dithioisocyanate, and hexamethylene dithioisocyanate. Examples of the carbodiimide compounds includes N,N'-diphenylcarbodiimide and N,N'-ethylcarbodiimide.

In the present invention, the modifier component (c) reactive with the active organic metal site bonded to the polymer is a heterotricyclic compound having the structure represented by the following formula (VI):

[Chemical Formula 10]

(VI)

where Y' is an oxygen atom or sulfur atom. When Y' is an oxygen atom, the component (d) is an epoxy compound. When Y' is a sulfur atom, the component (d) is a thiirane compound. Examples of the epoxy compound include ethylene oxide, propylene oxide, cyclohexene oxide, styrene oxide, epoxidized soybean oil, and epoxidized natural rubber. Examples of the thiirane compound include thiirane, methylthiirane, and phenylthiirane.

In the present invention, the modifier component (e) reactive with the active organic metal site bonded to the polymer is a halogenated isocyano compound having the structure represented by the following formula (XXII):

$$>N=C-X \text{ bond} \qquad (XXII)$$

where X is a halogen atom. Examples of the halogenated isocyano compounds, as the component (e), include 2-amino-6-chloropyridine, 2,5-dibromopyridine, 4-chloro-2-phenylquinazoline, 2,4,5-tribromoimidazole, 3,6-dichloro-4-methylpyridazine, 3,4,5-trichloropyridazine, 4-amino-6-chloro-2-mercaptopyrimidine, 2-amino-4-chloro-6-methylpyrimidine, 2-amino-4,6-dichloropyrimidine, 6-chloro-2,4-dimethoxypyrimidine, 2-chloropyrimidine, 2,4-dichloro-6-methylpyrimidine, 4,6-dichloro-2-(methylthio)pyrimidine, 2,4,5,6-tetrachloropyrimidine, 2,4,6-trichloropyrimidine, 2-amino-6-chloropyrazine, 2,6-dichloropyrazine, 2,4-bis(methylthio)-6-chloro-1,3,5-triazine, 2,4,6-trichloro-1,3,5-triazine, 2-bromo-5-nitrothiazole, 2-chlorobenzothiazole, and 2-chlorobenzooxazole.

In the present invention, the modifier component (f) reactive with the active organic metal site bonded to the polymer includes a carboxylic acids, acid halides, ester compounds, carbonic ester compounds, and acid anhydrides having the structure represented by the following formulae (XXIII) to (XXVII) and (VII), respectively:

$$R^{46}\text{—(COOH)}_m \quad \text{(XXIII)}$$

$$R^{47}(\text{COZ})_m \quad \text{(XXIV)}$$

$$R^{48}\text{—(COO—}R^{49}) \quad \text{(XXV)}$$

$$R^{50}\text{—OCOO—}R^{51} \quad \text{(XXVI)}$$

$$R^{52}\text{—(COOCO—}R^{53})_m \quad \text{(XXVII)}$$

[Chemical Formula 11]

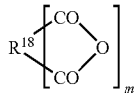

(VII)

where $R^{46}$ to $R^{53}$ may be the same or different and are each a hydrocarbon group containing 1 to 50 carbon atoms; Z is a halogen atom; and m is an integer of 1 to 5 Examples of the carboxylic acids represented by the formula (XXIII) of the component (f), include acetic acid, stearic acid, adipic acid, maleic acid, benzoic acid, acrylic acid, methacrylic acid, phthalic acid, isophthalic acid, terephthalic acid, trimellitic acid, pyromellitic acid, mellitic acid, and complete or partial hydrolysis products of polymethacrylic ester compounds or polyacrylic acid compounds.

Examples of acid halides represented by the formula (XXIV) include acetyl chloride, propionyl chloride, butanoyl chloride, isobutanoyl chloride, octanoyl chloride, acryl chloride, benzoyl chloride, stearoyl chloride, phthaloyl chloride, maloyl chloride, oxaloyl chloride, acetyl iodide, benzoyl iodide, acetyl fluoride, and benzoyl fluoride.

Examples of ester compounds represented by the formula (XXV) include ethyl acetate, ethyl stearate, ethyl adipate, diethyl maleate, methyl benzoate, ethyl acrylate, ethyl methacrylate, diethyl phthalate, dimethyl terephthalate, tributyl trimellitate, tetraoctyl pyromellitate, hexaethyl mellitate, phenyl acetate, poly(methyl methacrylate), poly(ethyl acrylate), and poly(isobutyl acrylate). Examples of carbonic ester compounds represented by the formula (XXVI) include dimethyl carbonate, diethyl carbonate, dipropyl carbonate, dihexyl carbonate, and diphenyl carbonate. Examples of the acid anhydrides include intermolec:ularacid anhydrides represented by the formula (XXVIII), such as acetic anhydride, propionic anhydride, propionic anhydride, valeric anhydride, heptanoic anhydride, benzoic anhydride, and cinnamic anhydride; and intramolecular acid anhydrides represented by the formula (III), such as succinic anhydride, methylsuccinic anhydride, maleic anhydride, giutaric anhydride, citraconic anhydride, phthalic anhydride, and styrene-maleic anhydride copolymers.

The compounds of the component (f) may contain aprotic polar groups, such as an ether group and tertiary amino group in the coupling agent molecule within the scope of the present invention. The components (f) may be used alone or in combination of two or more. The component (f) may contain compounds having a Free hydroxyl group or phenol group as impurities. The components (f) may be used alone or in combination of two or more. The component (t) may contain compounds having a free hydroxyl group or phenol group as impurities In the present invention, the modifier component (g) reactive with the active organic metal site bonded to the polymer includes carboxylic acid metal salts having the structures represented by the formulae (XXVIII) to (XXIV) and (VIII):

$$R^{53}{}_k M''((OCOR^{54})_{4-k} \quad \text{(XXVIII)}$$

$$R^{55}{}_k M''(OCO\text{—}R^{56}\text{—}COOR^{57})_{4-l} \quad \text{(XXIX)}$$

[Chemical Formula 12]

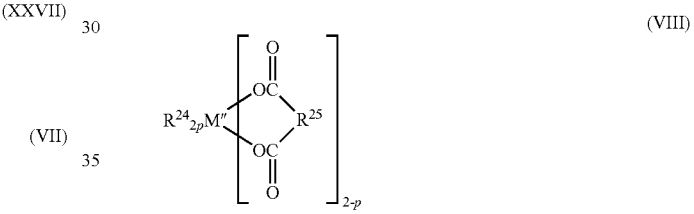

(VIII)

where $R^{53}$ to $R^{57}$ may be the same or different and are each a hydrocarbon group containing 1 to 20 carbon atoms; M" is a tin, silicon, or germanium atom; and k is an integer of 0 to 3.

Examples of the compounds represented by the formula (XXVIII) of the component (g) include triphenyltin laurate, triphenyltin 2-ethylhexanoate, triphenyltin naphthenate, triphenyltin acetate, triphenyltin acrylate, tri-n-butyltin laurate, tri-n-butyltin 2-ethylhexanoate, tri-n-butyltin naphthenate, tri-n-butyltin acetate, tri-n-butyltin acrylate, tri-t-butyltin laurate, tri-t-butyltin 2-ethylhexanoate, tri-t-butyltin naphthenate, tri-t-butyltin acetate, tri-t-butyltin acrylate, triisobutyltin laurate, triisobutyltin 2-ethylhexanoate, triisobutyltin naphthenate, triisobutyltin acetate, triisobutyltin acrylate, triisopropyltin laurate, triisopropyltin 2-ethylhexanoate, triisopropyltin naphthenate, triisopropyltin acetate, triisopropyltin acrylate, trihexyltin laurate, trihexyltin 2-ethylhexanoate, trihexyltin acetate, trihexyltin acrylate, trioctyltin laurate, trioctyltin 2-ethylhexanoate, trioctyltin naphthenate, trioctyltin acetate, trioctyltin acrylate, tri(2-ethylhexyl)tin laurate, tri(2-ethylhexyl)tin 2-ethylhexanoate, tri(2-ethylhexyl)tin naphthenate, tri(2-ethylhexyl)tin acetate, tri(2-ethylhexyl)tin acrylate, tristearyltin laurate, tristearyltin 2-ethylhexanoate, tristearyltin naphthenate, tristearyltin acetate, tristearyltin acrylate, tribenzyltin laurate, tribenzyltin 2-ethylhexanoate, tribenzyltin naphthenate, tribenzyltin acetate, tribenzyltin acrylate, diphenyltin dilaurate, diphenyltin di-2-ethylhexanoate, diphenyltin distearate, diphenyltin dinaphthenate, diphenyltin diacetate, diphenyltin diacrylate, di-n-butyltin dilaurate, di-n-butyltin di-2-ethylhexancate, di-n-butyltin distearate, di-n-butyltin dinaphthenate, di-n-butyltin diacetate, di-n-butyltin diacrylate, di-t-butyltin dilaurate, di-t-butyltin di-2-ethylhexanoate, di-t-butyltin distearate, di-t-butyltin dinaphthenate, di-t-butyltin diacetate, di-t-butyltin diacrylate, diisobutyltin dilaurate, diisobutyltin di-2-ethylhexanoate, diisobutyltin distearate, diisobutyltin dinaphthenate, diisobutyltin diacetate, diisobutyltin diacrylate, diisopropyltin dilaurate, diisopropyltin di-2-ethylhexanoate, diisopropyltin distearate, diisopropyltin dinaphthenate, diisopropyltin diacetate, diisopropyltin diacrylate, dihexyltin dilaurate, dihexyltin di-2-ethylhexanoate, dihexyltin distearate, dihexyltin dinaphthenate, dihexyltin diacetate, dihexyltin diacrylate, di(2-ethylhexyl)tin dilaurate, di(2-ethylhexyl)tin di-2-ethylhexanoate, di(2-ethylhexyl)tin distearate, di(2-ethylhexyl)tin dinaphthenate, di(2-ethylhexyl)tin diacetate, di(2-ethylhexyl)tin diacrylate, dioctyltin dilaurate, dioctyltin di-2-ethylhexanoate, dioctyltin distearate, dioctyltin dinaphthenate, dioctyltin diacetate, dioctyltin diacrylate, distearyltin dilaurate, distearyltin di-2-ethylhexanoate, distearyltin distearate, distearyltin dinaphthenate, distearyltin diacetate, distearyltin diacrylate, dibenzyltin dilaurate, dibenzyltin di-2-ethylhexanoate, dibenzyltin distearate, dibenzyltin dinaphthenate, dibenzyltin diacetate, dibenzyltin diacrylate, phenyltin trilaurate, phenyltin tri-2-ethylhexanoate, phenyltin trinaphthenate, phenyltin triacetate, phenyltin triacrylate, n-butyltin trilaurate, n-butyltin tri-2-ethylhexanoate, n-butyltin trinaphthenate, n-butyltin triacetate, n-butyltin triacrylate, t-butyltin trilaurate, t-butyltin tri-2-ethylhexancate, t-butyltin trinaphthenate, t-butyltin triacetate, t-butyltin triacrylate, isobutyltin trilaurate, isobutyltin tri-2-ethylhexanoate, isobutyltin trinaphthenate, isobutyltin triacetate, isobutyltin triacrylate, isopropyltin trilaurate, isopropyltin tri-2-ethylhexanoate, isopropyltin trinaphthenate, isopropyltin triacetate, isopropyltin triacrylate, hexyltin trilaurate, hexyltin tri-2-ethylhexanoate, hexyltin trinaphthenate, hexyltin triacetate, hexyltin triacrylate, octyltin trilaurate, octyltin tri-2-ethylhexanoate, octyltin trinaphthenate, octyltin triacetate, benzyltin triacrylate, 2-ethylhexyltin trilaurate, 2-ethylhexyltin tri-2-ethylhexanoate, 2-ethylhexyltin trinaphthenate, 2-ethylhexyltin triacetate, 2-ethylhexyltin triacrylate, stearyltin trilaurate, stearyltin tri-2-ethylhexanoate, stearyltin trinaphthenate, stearyltin triacetate, stearyltin triacrylate, benzyltin trilaurate, benzyltin tri-2-ethylhexanoate, benzyltin trinaphthenate, benzyltin triacetate, and benzyltin triacrylate.

Examples of the compounds represented by the formula (XXIX) include diphenyltin bismethylmalate, diphenyltin bis-2-ethylhexanoate, diphenyltin bisoctylmalate, diphenyltin bisoctylmalate, diphenyltin bisbenzylmalate, di-n-butyltin bismethylmalate, di-n-butyltin bis-2-ethylhexanoate, di-n-butyltin bisoctylmalate, di-n-butyltin bisbenzylmalate, di-t-butyltin bismethylmalate, di-t-butyltin bis-2-ethylhexanoate, di-t-butyltin bisoctylmalate, di-t-butyltin bisbenzylmalate, diisobutyltin bismethylmalate, diisobutyltin bis-2-ethylhexanoate, diisobutyltin bisoctylmalate, diisobutyltin bisbenzylmalate, diisopropyltin bismethylmalate, diisopropyltin bis-2-ethylhexanoate, diisopropyltin bisoctylmalate, diisopropyltin bisbenzylmalate, dihexyltin bismethylmalate, dihexyltin bis-2-ethylhexanoate, dihexyltin bisoctylmalate, dihexyltin bisbenzylmalate, di-2-ethylhexyltin bismethylmalate, di-2-ethylhexyltin bis-2-ethylhexanoate, di-2-ethylhexyltin bisoctylmalate, di-2-ethylhexyltin bisbenzylmalate, dioctyltin bismethylmalate, dioctyltin bis-2-ethylhexanoate, dioctyltin bisoctylmalate, dioctyltin bisbenzylmalate, distearylitin bismethylmalate, distearyltin bis-2-ethylhexanoate, distearyltin bisoctylmalate, distearyltin bisbenzylmalate, dibenzyltin bismethylmalate, dibenzyltin bis-2-ethylhexanoate, dibenzyltin bisoctylmalate, dibenzyltin bisbenzylmalate, diphenyltin bismethyladipate, diphenyltin bis-2-ethylhexanoate, diphenyltin bisoctyladipate, diphenyltin bisbenzyladipate, di-n-butyltin bismethyladipate, di-n-butyltin bis-2-ethylhexanoate, di-n-butyltin bisoctyladipate, di-n-butyltin bisbenzyladipate, di-t-butyltin bismethyladipate, di-t-butyltin bis-2-ethylhexanoate, di-t-butyltin bisoctyladipate, di-t-butyltin bisbenzyladipate, diisobutyltin bismethyladipate, diisobutyltin bis-2-ethylhexanoate, diisobutyltin bisoctyladipate, diisobutyltin bisbenzyladipate, diisobutyltin bismethyladipate, diisopropyltin bis-2-ethylhexancate, diisobutyltin bisoctyladipate, diisobutyltin bisbenzyladipate, dihexyltin bismethyladipate, dihexyltin bis-2-ethylhexanoate, dihexyltin bismethyladipate, dihexyltin bisbenzyladipate, di-2-ethylhexyltin bismethyladipate, di-2-ethylhexyltin bis-2-ethylhexanoate, di-2-ethylhexyltin bisoctyladipate, di-2-ethylhexyltin bisben-ethylhexyltin bisbenzyladipate, dioctyltin bismethyladipate, dioctyltin bis-2-ethylhexanoate, dioctyltin bisoctyladipate, dioctyltin bisbenzyladipate, distearyltin bismethyladipate, distearyltin bis-2-ethylhexanoate, distearyltin bisoctyladipate, distearyltin bisbenzyladipate, dibenzyltin bismethyladipate, dibenzyltin bis-2-ethylhexanoate, dibenzyltin bisoctyladipate, and dibenzyltin bisbenzyladipate.

Examples of the compounds represented by the formula (VIII) include diphenyltin malate, di-n-butyltin malate, di-t-butyltin malate, diisobutyltin malate, diisopropyl tin malate, dihexyltin malate, di-2-ethylhexyltinmalate, dioctyltin malate, distearyltin malate, dibenzyltin malate, diphenyltin adipate, di-n-butyltin adipate, di-t-butyltin adipate, diisobutyltin adipate, diisopropyltin adipate, dihexyltin diacetate, di-2-ethylhexyltin adipate, dioctyltin adipate, distearyltin adipate, and dibenzyltin adipate.

In the present invention, the modifier component (h) reactive with the active organic metal site bonded to the polymer includes N-substituted aminoketones, N-substituted aminothioketones, N-substituted aminothioketones, N-substituted aminoaldhydes, N-substituted aminothioaldhydes, and a compound a —C-(=M)-N< bond (M represents an oxygen or sulfur atom)in its molecule.

Examples of the component (h) include N-substituted aminoketones and corresponding N-aminothioketones, such as 4-dimethylaminoacetophenone, 4-diethylaminoacetophenone, 1,3-bis(diphenylamino)-2-propanone, 1,7-bis(methylethylamino)-4-heptanone, 4-dimethylaminobenzophenone, 4-di-t-butylaminobenzophenone, 4-diphenylaminobenzophenone, 4,4'-bis(dimethylamino)benzophenone, 4,4'-bis(diethylamino)benzophenone, and 4,4'-bis(diphenylamino)benzophenone; N-substituted aminoaldhydes and corresponding N-substituted aminothioaldehydes, such as 4-(dimethylamino)benzaldehyde, 4-diphenylaminobenzaldehyde, and 4-divinylaminobenzaldehyde; compounds having a —C-(-M)-N< bond (M represents an oxygen or sulfur atom) in their molecules such as N-substituted lactams and corresponding N-substituted thiolactams, e.g. N-methyl-α-propiolactam, N-phenyl-β-propiolactam, N-methyl-2-pyrrolidone, N-phenyl-2-pyrrolidone, N-t-butyl-2-pyrrolidone, N-phenyl-5-methyl-2-pyrrolidone, N-methyl-2-piperidone, N-phenyl-2-piperidone, N-methyl-ε-caprolactam, N-phenyl-ε-caprolactam, N-methyl-ω-caprolactam, N-phenyl-ω-caprolactam, N-methyl-ω-laurylolactam, and w-laurylolactam; and N-substituted cyclic ureas and corresponding N-substituted cyclic thioureas, such as 1,3-dimethylethyleneurea, 1,3-divinylethyleneurea, 1,3-diethyl-2-imidazolidinone, 1-methyl-3-ethyl-2-imidazolidinone, and 1,3-dimethyl-2-imidazolidinone.

These modifier components (a) to (h) may be used alone or in combination of two or more.

The modifier component (i) reactive with the active organic metal site bonded to the polymer in the present invention is described.

In the polymer used in the primary modification of the present invention, preferably, at least 15% of the polymer chains exhibits living characteristics, In this primary modification, the hydrocarbyloxysilane compounds as the component (i) used in the reaction with the active organic metal site bonded to the polymer include hydrocarbyloxysilane compounds represented by the general formula (IX):

[Chemical Formula 13]

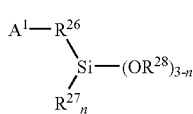
(IX)

(where $A^1$ is a monovalent group having at least one selected from the group consisting of (thio)epoxies, (thio)isocyanates, (thio)ketones, (thio)aldehydes, imines, amides, isocyanuric acid triesters, (thio)carboxylic acid hydrocarbyl esters, (thio) carboxylic acid metal salts, carboxylic anhydrides, carboxylic halides, and carbonic acid hydrocarbyl esters; $R^{26}$ is a single bond or a divalent inactive hydrocarbon group; $R^{27}$ and $R^{28}$ independently represent a monovalent aliphatic hydrocarbon group having 1 to 20 carbons or a monovalent aromatic hydrocarbon group having 6 to 18 carbons; n is an integer of 0 to 2; if a plurality of $OR^{28}$'s are present, $OR^{28}$'s may be the same or different; and no active proton nor onium salt is contained in the molecule) and/or partial condensates thereof.

In the functional groups of $A^1$ in the formula (IX), imines include ketimines, aldimines, and amidines, and (thio)carboxylic acid esters include unsaturated carboxylic acid ester such as acrylates and methacrylate. Examples of metals of (thio)carboxylic acid metal salts include alkali metals, alkaline earth metals, Al, Sn, and Zn.

Preferably, the divalent inactive hydrocarbon group of $R^{26}$ is an alkylene group having 1 to 20 carbon atoms. The alkylene group may be linear, branched, or cyclic, and preferably linear. Examples of the linear alkylene groups include a methylene group, ethylene group, trimethylene group, tetramethylene group, pentamethylene group, hexamethylene group, octamethylene group, decamethylene group, and dodecamethylene group.

Examples of $R^{27}$ and $R^{26}$ include C1 to C20 alkyl groups, C2 to C18 alkenyl groups, C6 to C18 aryl groups, and C7 to C18 aralkyl groups. The alkyl groups and alkenyl groups may be linear, branched, or cyclic, Examples of such groups include a methyl group, ethyl group, n-propyl group, isopropyl group, n-butyl group, isobutyl group, sec-butyl group, tert-butyl group, pentyl group, hexyl group, octyl group, decyl group, dodecyl group, cyclopentyl group, cyclohexyl group, vinyl group, propenyl group, allyl group, hexenyl group, octenyl group, cyclopentenyl group, and cyclohexenyl group.

The aryl groups may contain a substituted groups such as lower alkyl groups on the aromatic rings. Examples of such substituted groups include a phenyl group, tolyl group, xylyl group, and naphthyl group. The aralkyl groups may also contain substituted groups such as lower alkyl groups on the aromatic rings. Examples of such substituted groups include a benzyl group, phenethyl group, and naphthylmethyl group.

In the formula, n is an integer of 0 to 2, and preferably 0. This molecule does not contain an active proton or onium ion.

Examples of preferred hydrocarbyloxysilane compounds represented by the formula (IX) include (thio)epoxy group containing hydrocarbyloxysilane compounds, e.g. 2-glycidoxyethyltrimethoxysilane, 2-glycidoxyethyltriethoxysilane, (2-glycidoxyethyl)methyldimethoxysilane, 3-glycidoxypropyltrimethoxysilane, 3-glycidoxypropyltriethoxysilane, (3-glycidoxypropyl)methyldimethoxysilane, 2-(3,4-epoxycyclohexyl)ethyltrimethoxysilane, 2-(3,4-epoxycyclohexyl)ethyltriethoxysilane, 2-(3,4-epoxycyclohexyl)ethyl(methyl)dimethoxysilane, and derivative substitutions thereof in which the epoxy group is substituted by a thioepoxy group. Among them particularly preferred are 3-glycidoxypropyltrimethoxysilane and 2-(3,4-epoxycyclohexyltrimethoxysilane.

Examples of preferred imino group containing hydrocarbyloxycyanide compounds include N-(1,3-dimethylbutylidene)-3-(triethoxysilyl)-1-propanamine, N-(1-methylethylidene)-3-(triethoxysilyl)-1-propanamine, N-ethylidene-3-(triethoxysilyl)-1-propanainine, N-(1-methylpropylidene)-3-(triethoxysilyl)-1-propanamine, N-(4-N,N-dimethylaminobenzylidene)-3-(triethoxysilyl)-1-propanamine, N-(cyclohexylidene)-3-(triethoxysilyl)—1 propanamine, and corresponding trimethoxysilyl compounds of these triethoxysilyl compounds; methyl diethoxysilyl compounds; ethyl diethoxysilyl compounds; methyl dimethoxysilyl compounds; and ethyl dimethoxysilyl compounds. Among them particularly preferred are N-(1-methylpropylidene)-3-(triethoxysilyl)-1-propanamine and N-(1, 3-dimethylbutylidene)-3-(triethoxysilyl)-1-propanamine.

Other hydrocarbyloxy compounds are as follows. Examples of the imino(amidino) group containing compounds include 1-[3-(triethoxysilyl)i-propyl]-4,5-dihydroimidazole, 1-[3-(trimethoxysilyl)propyl]-4,5-dihydroimidazole, and 3-[10-(triethoxysilyl)decyl]-4-oxazoline. Among them hydrocarbyloxy compounds particularly preferred are 3-(1-hexamethyleneimino)propyl(triethoxy)silane, (1-hexamethyleneimino)methyl(trimethoxy)silane, 1-[3-(triethoxysilyl)i-propyl]-4,5-dihydroimidazole, and 1-[3-(trimethoxysilyl)propyl]-4,5-dihydroimidazole. Further examples include N-[3-(triethoxysilylpropyl)-4,5-dihydroimidazole, N-(3-isopropoxysilylpropyl)-4,5-dihydroimidazole, and N-(3-methyldiethoxysilylpropy)-4,5-dihydroimidazole. Among them preferred is N-(3-triethoxysilylpropyl)-4,5-dihydroimidazole.

Examples of the carboxylic acid ester group containing compounds include 3-methacryloyloxypropyltriethoxysilane, 3-methacryloyloxypropyltrimethoxysilane, 3-methacryloyloxypropylmethyldiethoxysilane, and 3-methacryloyloxypropyltriisopropoxysilane. Among them preferred is 3-methacryloyloxypropyltrimethoxysilane. Examples of the isocyanate group containing compounds include 3-isocyanatopropyltrimethoxysilane, 3-isocyanatopropyltriethoxysilane, 3-isocyanatopropylmethyldiethoxysilane, and 3-isocyanatopropyltriisopropoxysilane. Among them preferred is 3-isocyanatopropyltriethoxysilane. Examples of the carboxylic anhydride containing compounds include 3-triethoxysilylpropylsuccinic anhydride, 3-trimethoxysilylpropylsuccinic anhydride, and 3-methyldiethoxysilylprQpylsuccinic anhydride. Among them preferred is 3-triethoxysilylpropylsuccinic anhydride.

These hydrocarbyloxysilane compounds may be used alone or in combination of two or more. Also, partial condensates of the hydrocarbyloxysilane compounds may be used.

In the primary modification, the active end of the polymer first reacts with the hydrocarbyloxysilane compound, The active group introduced is allowed to react with (1) carboxylic acid partial ester of a multivalent alcohol for stabilization or (2) the residual or further added hydrocarbyloxysilane compound in the presence of a condensation promoter. The latter process (2) is categorized into the following three variations (2-1) to (2-3):

(2-1) After the primary modification, the additional hydrocarbyloxysilane compound and the condensation promoter are added for secondary modification;

(2-2) After the primary modification, the condensation promoter is added to accelerate condensation of the residual end group of the hydrocarbyloxysilane compound with the unreacted hydrocarbyloxysilane compound; and (2-3) After the variations (2-1) and (2-2), the product is further allowed to react with the carboxylic acid partial ester of a multivalent alcohol for stabilization.

The term "carboxylic acid partial ester of a multivalent alcohol" means an ester having at least one hydroxyl group of a multivalent alcohol and a carboxylic acid. Preferably, esters of saccharides or modified saccharides having four or more carbons and fatty acids are used. Examples of preferred esters includes [1] partial esters of carboxylic acids and multivalent alcohols, in particular, partial esters (including monoesters, diesters, triesters) of saturated or unsaturated C10 to C20 higher carboxylic acids and multivalent alcohols, and [2] ester compounds in which one to three molecules of a partial ester of a multivalent carboxylic acid and a higher alcohol are bonded to a multivalent alcohol. Preferred examples of the polyhydric alcohols used as low materials for the partial esters include C5 or C6 saccharides having at least three hydroxyl groups (may be hydrogenated or not), glycols, and polyhydroxy compounds. Preferred examples of fatty acids as low materials C10 to C20 saturated or unsaturated fatty acids, such as stearic acid, lauric acid, and palmitic acid.

Among fatty acid partial esters of multivalent alcohols preferred are sorbitan fatty acid esters, for example, sorbitan monolauric acid ester, sorbitan monopalmitic acid ester, sorbitan monostearic acid ester, sorbitan tristearic acid ester, sorbitan monooleic acid ester, and sorbitan trioleic acid ester.

Commercially available products include SPAN60 (sorbitan stearic acid ester), SPAN80 (sorbitan monooleic acid ester), and SPAN85 (sorbitan trioleic acid ester), which are trade name by ICI.

Preferably, the partial ester is added in an amount of 0.2 to 10 mol, and in particular 1 to 10 mol on the basis of 1 mol of hydrocarbyloxysilyl group introduced into the polymer.

In addition to the compounds represented by the formula (IX), hydrocarbyloxysilane compounds represented by the formula (X):

[Chemical Formula 14]

(X)

(where $A^2$ is a monovalent group having at least one functional group selected from cyclic tertiary amines, acyclic tertiary amines, pyridine, sulfides, multisulfides, and nitrites: $R^{29}$ is a single bond or a divalent inactive hydrocarbon group; $R^{30}$ and $R^{31}$ independently represent a monovalent aliphatic hydrocarbon group having 1 to 20 carbon atoms or a monovalent aromatic hydrocarbon group having 6 to 18 carbon atoms; m is an integer of 0 to 2; if a plurality of $OR^{31}$'s are present, $OR^{31}$'s may be the same or different; no active proton or onium slat is contained in the molecule) and/or their partial condensates may be used with the hydrocarbyloxysilane compounds represented by the formula (IX) and/or their partial condensates.

The term "partial condensate" means SiOR of the hydrocarbyloxysilane compound is partly (not completely) converted into SiOSi bonds through condensation.

The hydrocarbyloxysilane compound represented by the formula (X) and/or their partial condensate does not substantially react with the active end directly, and thus remains in the reaction system. Such an unreacted compound is consumed in condensation with the residual group of the hydrocarbyloxysilane compound introduced into the active ends.

In the formula (X), the acyclic tertiary amines of $A^2$ may include N,N-(disubstituted)aromatic amines such as N,N-(disubstituted)anilines, and the cyclic tertiary amines may include (thio)ethers as a part of the ring, The divalent inactive hydrocarbon groups of $R^4$, $R^{10}$ and $R^{31}$ are the same as those in the description for $R^{26}$, $R^{27}$, and $R^{28}$ in the formula (IX). This molecule does not have an active proton or onium salt.

Examples of the hydrocarbyloxysilane compounds represented by the formula (X) include hydrocarbyloxysilane compounds containing acyclic tertiary amine groups, such as 3-dimethylaminopropyl(triethoxy)silane, 3-dimethylaminopropyl(trimethoxy)silane, 3-diethylaminopropyl(triethoxy)silane, 3-diethylaminopropyl(trimethoxy)silane, 2-dimethylaminoethyl(triethoxy)silane, 2-dimethylaminoethyl(trimethoxy)silane, 3-dimethylaminopropyl(diethoxy)methylsilane, and 3-dibutylaminopropyl(triethoxy)silane. Among them preferred are 3-diethylaminopropyl(triethoxy)silane and 3-dimethylaninopropyl(triethoxy)silane.

Examples of preferred hydrocarbyloxysilane compounds containing acyclic tertiary amine groups include 3-(1-hexamethyleneimino)propyl(triethoxy)silane, 3-(1-hexamethyleneimino)propyl(trimethoxy)silane, (1-hexamethyleneimino)methyl(trimethoxy)silane, (1-hexamethyleneimino)methyl(triethoxy)silane, 2-(1-hexamethyleneimino)ethyl(triethoxy)silane, 2-(1-hexamethyleneimino)ethyl(trimethoxy)silane, 3-(1-pyrrolidinyl)propyl(triethoxy)silane, 3-(1-pyrrolidinyl)propyl(trimethoxy)silane, 3-(1-heptamethyleneimino)propyl(triethoxy)silane, 3-(1-dodecamethyleneimino)propyl(triethoxy)silane, 3-(1-hexamethyleneimino)propyl(diethoxy)methylsilane, and 3-(1-hexamethyleneimino)propyl(diethoxy)ethylsilane. In particular, 3-(1-hexamethyleneimino)propyl(triethoxy)silane is more preferred.

Other examples of the hydrocarbyloxysilane compounds include 2-(trimethoxysilylethyl)pyridine, 2-(triethoxysilylethyl)pyridine, and 4-ethylpyridine.

These hydrocarbyloxysilane compounds may be used alone or in combination of two or more. Also, partial condensates of these hydrocarbyloxysilane compounds may be used.

In the variation (2-1), the hydrocarbyloxysilane compounds II to be condensed with the residue of the hydrocarbyloxysilane compounds I introduced into the active end of the polymer include at least one of the hydrocarbyloxysilane compounds represented by the formula (IX) and their partial condensates, hydrocarbyloxysilane compounds represented by the formula (X) and their partial condensates, and hydrocarbyloxysilane compounds represented by the formula (XI):

[Chemical Formula 16]

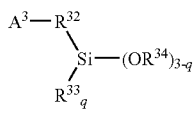
(XI)

[where $A^3$ is a monovalent group having at least one functional group selected from the group consisting of alcohols, thiols, primary amines or onium salts thereof, cyclic secondary amines or onium salts thereof, acyclic secondary amines or onium salts thereof, onium salts of cyclic tertiary amines, onium salts of acyclic tertiary amines, groups having aryl or benzyl Sn bonds, sulfonyls, sulfinyls, and nitrites; $R^{32}$ is a single bond or a divalent inactive hydrocarbon group; $R^{33}$ and $R^{34}$ are each independently a C1 to C20 monovalent aliphatic hydrocarbon group or a C6 to $Cl_x1$ monovalent aromatic hydrocarbon group; q is an integer of 0 to 2; and if a plurality of $OR^{34}$'s are present, $OR^{34}$'s may be the same or different] and their partial condensates.

The primary amines of $A^3$ in the formula (XI) include aromatic amines such as aniline, acyclic secondary amines include N-(monosubstituted) aromatic amines such as N-(monosubstituted) anilines. The onium salts of the acyclic tertiary amines include onium salts of N,N-(disubstituted) aromatic amines such as N,N-(disubstituted) anilines. The cyclic secondary amines and cyclic tertiary amines may include (thio)ethers as parts of the ring. The divalent inactive hydrocarbon groups of $R^{32}$, $R^{33}$ and $R^{34}$ are described above in the explanation for $R^{26}$, $R^{27}$, and $R^{28}$ in the formula (IX).

Examples of the hydrocarbyloxysilane compounds represented by the formula (XI) include 3-aminopropyltrimethoxysilane, 3-aminopropyltriethoxysilane, hydroxymethyltrimethoxysilane, hydroxymethyltriethoxysilane, mercaptomethyltrimethoxysilane, mercaptomethyltriethoxysilane, aminophenyltrimethoxysilane, aminophenyltriethoxysilane, 3-(N-methylamino)propyltrimethoxysilane, 3-(N-methylamino)propyltriethoxysilane, octadecyldimethyl(3-trimethylsilylpropyl)ammonium chloride, octadecyldimethyl(3-triethylsilylpropyl)ammonium chloride, cyanomethyltrimethoxysilane, cyanomethyltriethoxysilane, sulfonylmethyltrimethoxysilane, sulfonylmethyltriethoxysilane, sulfinylmethyltrimethoxysilane, and sulfinylmethyltriethoxysilane.

These hydrocarbyloxysilane compounds II may be used alone or in combination of two or more.

In the process (2) in which the residual or further added hydrocarbyloxysilane compound is allowed to react in the presence of a condensation promoter, the polymer having active ends first reacts with a substantially stoichiometrical amount of hydrocarbyloxysilane I added to the reaction system, so that the hydrocarbyloxysilyl groups are introduced into all the ends (primary modification). Next, the introduced hydrocarbyloxysilyl groups are allowed to react with a compound containing a hydrocarbyloxyl group, such that the residues of the hydrocarbyloxysilane compound is introduced into the active end in an amount greater than the equivalent. As a result, low heat build-up and processability are further improved. Thus, the process (2) is preferred to the process (1).

When the hydrocarbyloxysilane compound is an alkoxysilyl compound in the invention, it is preferred that condensation of the alkoxysilyl group in the process (2) occurs between (remaining or newly added) free alkoxysilane and the alkoxysilyl group of the polymer end, or the alkoxysilyl group at the polymer end depending on circumstances The reaction between the free alkoxysilane molecules is unnecessary.

In the case of newly adding the alkoxysilane compound, preferably hydrolyzability of the alkoxysilyl group is not superior to that of the alkoxysilyl group at the polymer ends in view of efficiency. For example, a combination of a compound containing a readily hydrolyzable trimethoxysilyl group as the alkoxysilane I and a compound containing a less hydrolyzable alkoxysilyl group (for example, triethoxysilyl group) as the newly added alkoxysilane II is preferred. In contrast, a combination of a triethoxysilyl group containing alkoxysilane I and a trimethoxysilyl group containing alkoxysilane XI is not preferred in view of reaction efficiency, though this combination is within the scope of the invention.

The modification reaction in the present invention may be either liquid-phase reaction or solid-phase reaction. The liquid-phase reaction is preferred (a solution containing unreacted monomer used in the polymerization may be used)-Any type of the modification reaction can be employed without limitation. For example, batch reactors or continuous reactors such as multi-stage continuous reactors and in-line mixers can be used. The modification reaction after the polymerization reaction must be carried out before necessary processes such as solvent removal, aqueous treatment, thermal treatment, and polymer isolation.

The temperature of the modification reaction may be the same as that of the polymerization temperature of the conjugated diene polymer. The preferred temperature range is from 20° C. to 100° C., A temperature below this range causes the viscosity of the polymer to increase, whereas a temperature above this range accelerates undesirable deactivation of the polymer active ends.

The secondary modification is preferably carried out in the presence of a condensation promoter. A preferred example of the condensation promoter is a combination of metal compounds generally known as hardening catalysts for room-temperature vulcanizable silicone of alkoxy condensation hardening type and water. For example, a combination of tin carboxylate and/or titanium alkoxide and water is preferred.

Feeding of water as the condensation promoter in the reaction system is not limited It may be a solution with water-miscible alcohol. Alternatively, water may be directly injected, dispersed, or dissolved by a variety of chemical engineering approaches.

Preferably, such a condensation promoter comprises water and at least one selected from the group consisting of the following metal compounds (1) and (3):

(1) C3-C30 carboxylate salts of tin(II)

where $R^{58}$'s are each an organic group having 2 to 19 carbons and may be the same or different;

(2) tin(IV) compounds satisfying the following general formula:

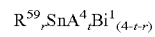

where r is an integer of 1 to 3; t is an integer of 1 or 2; t+r is an integer of 3 or 4; $R^{59}$ is an aliphatic hydrocarbon group having 1 to 30 carbon atoms; $B^1$ is a hydroxyl group or halogen atom; $A^4$ is a group selected from [1] a carboxyl group having 2 to 30 carbon atoms, [2] an α,γ-dionyl group having 5 to 30 carbon atoms, [3] a hydrocarbyloxy group having 3 to 30 carbon atoms, and [4] a siloxy group trisubstituted by a hydrocarbyl group having 1 to 20 carbons and/or a hydrocarbyloxy group having 1 to 20 carbons in total (may be the same or different); and if a plurality of $A^4$'s are present, these may be the same or different.

(3) titanium(IV) compounds satisfying the following general formula:

$$A^5{}_x TiB^2{}_{(4-x)}$$

where x is an integer of 2 or 4; $A^5$'s are each [1] an alkoxy group having 3 to 30 carbon atoms, [2] a siloxy group trisubstituted by an alkyl group having 1 to 30 carbon atoms and/or an alkoxy group having 1 to 20 carbon atoms in total; $A^5$'s may be the same or different; $B^2$ is an α,γ-dionyl group having 5 to 30 carbon atoms.

Examples of the tin carboxylate salts include (1) tin(II) dicarboxylate salts (preferably, carboxylate salts having 8 to 20 carbon atoms), (2) dihydrocarbyltin(IV) carboxylate salts [including bishydrocarbyldicarboxylate salts], bis(α,γ-diketonates), alkoxyhalides, monocarboxylate salt hydroxides, alkoxy(trihydrocarbyl siloxides), alkoxy(dihydrocarbylalkoxy siloxides), bis(trihydrocarbyl siloxides), and bis(dihydrocarbyl alkoxysiloxides). The hydrocarbyl group directly bonded to tin preferably has at least four carbon atoms and more preferably four to eight carbon atoms.

Examples of the titanium compounds include tetraalkoxides, dialkoxyl bis((α,γ-diketonates), and tetrakis(trihydrocarbioxysiloxides) of titanium(IV). Tetraalkoxides are preferably used. Examples of preferably used water include water only, a solution in alcohol or other solvents, dispersed micell in a hydrocarbon solvent. Also, water contained in compounds that can release water during the reaction, such as water adsorbed on a solid surface and water of hydrated substances can be effectively used, if necessary.

These two materials to form a condensation promoter may be fed separately or as a mixture immediately before the use into a reaction system. Long term preservation of the mixture, however, is not recommended because the metal compound is decomposed.

With the amount of the condensation promoter to be used, the amounts of the metal component in the metal compound and water contributing to the reaction to the total amount of the hydrocarbyloxysilyl groups are each preferably 0.1 or more on the molar basis. It is preferred that effective water be present in a molar ratio of about 0.5 to 3 to the total amount of the hydrocarbyloxysilyl groups bonded to the polymer ends during and before the condensation process, although the upper limit depends on the object and reaction conditions. The molar ratio of the metal component of the metal compounds to water is preferably in the range of approximately 1/0.5-1/20, although it deepens on reaction conditions required.

In the present invention, after the hydrocarbyloxysilane compound is allowed to react with the active end of the polymer, it may be allowed to react with a condensation promoter and then with one of the carboxylic acid ester compounds of the polyhydric alcohols.

The amount of the modifier used to the component (A) of the polymerization catalyst described below is in the range of 0.1 to 100 and preferably 1.0 to 50 on the molar basis, although the amount depends on the terminal modification efficiency of the resulting modified polymer. Such a range on the amount of the modifier promotes the modification reaction that can produce a polymer not containing a toluene-insoluble component (gel) and exhibiting low heat build-up and high abrasion resistance.

This modification reaction is typically carried out with stirring at room temperature to 100° C. for 0.5 minutes to 2 hours and preferably 3 minutes to 1 hour. A conjugated diene polymer having a high terminal modification efficiency can be prepared by polymerization using a catalyst under polymerization conditions for achieving high terminal living rate followed by terminal modification reaction.

The modifier component (j) reactive with the active organic metal site bonded to the polymer is described.

The modifier component (j) used is at least one selected from the compounds represented by the general formula (XII) and (XIII):

[Chemical Formula 16]

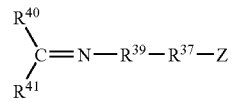
(XII)

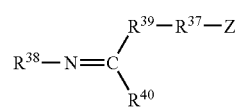
(XIII)

where Z is a substituent to react or interact with an organic or inorganic filler; $R^{37}$ is a single bond or a divalent organic group; Re is a monovalent organic group or a divalent organic group that forms a cyclic organic group together with $R^{39}$ or $R^{40}$; $R^{39}$ is a single bond, a divalent organic group, or a trivalent organic group that forms a cyclic organic group together with $R^{38}$, $R^{40}$, or $R^{41}$; $R^{40}$ is a monovalent organic group or a divalent organic group that forms a cyclic organic group together with $R^{30}$, $R^{39}$, or $R^{41}$; $R^{41}$ is a monovalent organic group or a divalent organic group that forms a cyclic organic group together with $R^{38}$, $R^{39}$, or $R^{40}$, with the provision that each group bonded to the imino carbon atom is bonded via a carbon atom, and $R^{37}$, $R^{38}$, $R^{39}$, $R^{40}$, $R^{41}$ and Z are each substituent that does not contain an active proton deactivating the active organic metal site. In the formula (XII), at least one of $R^{40}$ and $R^{41}$ is bonded to the imino carbon via a carbon atom, and the $R^{39}$ in the formula (XIII) is bonded to the imino carbon via a carbon atom.

In the formula, Z is an N,N-disubstituted aminophenyl group, imino group, or cyclic amino group.

Examples of the modifier component (j) include dimethylaminobenzylidene ethylamine, diethylaminobenzylidene ethylamine; dimethylaminobenzylidene aniline, dimethylaminobenzylidene n-butylaniline, dimethylaminobenzylidene dodecylaniline, dimethylaminobenzylidene metoxyaniline, dimethylaminobenzylidene dimethylaminoaniline, bis(dimethylaminophenyl)methylidene butylamine, bis(dimethylaminophenyl)methylidene n-octylamine, bis(diethylaminophenyl)methylidene butylamine, bis(diethylaminophenyl)methylidene n-octylamine, benzylidene dimethylaminoaniline, methoxybenzylidene dimethylaminoaniline, 1-methyl-4-penten-2-yl-methylidene dimethylaniline, 1,3-dimethylbutylidene dimethylaniline, and mixtures thereof; phenylene bis(dimethylaminobenzylidene amine); and benzylidene (1-hexamethyleneimino)aniline, benzylidene (1-pyrrolidino)aniline, dimethylaminobenzylidene (1-hexamethyleneimino)aniline, dimethylaminobenzylidene(1-pyrrolidino)aniline, (1-hexamethyleneimino)benzylidene aniline, (1-pyrrolidino)benzylidene aniline, benzylidene ((4-n-butyl-1-piperazino)methyl)aniline, benzylidene ((3-(1-methyl)pyrrolidino)methyl)aniline, ((4-n-butyl-1-piperazino)methyl)benzylidene aniline, ((3-(1-methyl)pyrrolidino)methyl)benzylidene aniline, and mixtures thereof.

[Catalyst System]

The catalyst system used for polymerization of the terminal-active polymer is described.

Preferably, the conjugated diene compound is polymerized using a catalyst system comprising:

component (A): a lanthanoid rare earth element compound of atomic number 57 to 71 in the periodic table or a reaction product thereof with a Lewis base, component (B): an organic aluminum compound represented by the general formula (XXX):

$$AlR^{60}R^{61}R^{62} \quad (XXX)$$

where $R^{60}$ and $R^{61}$ may be the same or different, and are each a C1-C10 hydrocarbon group or a hydrogen atom; $R^{62}$ is a C1-C10 hydrocarbon group; and $R^{62}$ may be the same or different from $R^{60}$ or $R^{61}$), and component (C): at least one of a Lewis acid, a complex of a metal halide with a Lewis base, and an organic compound containing active halogen.

The catalyst system may further contain component (D): aluminoxane. It is preferred that the catalyst system be preliminarily prepared in the presence of the components (A), (B), (C), and (D) and conjugated diene monomer.

In the present invention, the component (A) in the catalyst system used in the polymerization of the terminal-active polymer is a lanthanoid rare earth element compound of atomic number 57 to 71 in the periodic table or a reaction product thereof with a Lewis base, Among the lanthanoid rare earth element compounds of atomic number 57 to 71 preferred are neodymium, praseodymium, cerium, lanthanum, gadolinium, and mixture thereof, and more preferred is neodymium.

Preferable lanthanoid rare earth element compounds are in the form of salts soluble in hydrocarbon solvents. Examples of such salts include carboxylic acid salts, alkoxides, β-diketone complexes, phosphates, and phosphites of the rare earth metal elements. Among them preferred are carboxylic acid salts and phosphate salts and more preferred are carboxylic acid salts.

Examples of the hydrocarbon solvents include C4 to C10 saturated aliphatic hydrocarbons, such as butane, pentane, hexane, and heptane; C5 to C20 saturated alicyclic hydrocarbons, such as cyclopentane and cyclohexane; monoolefins, such as 1-butene and 2-butene; aromatic hydrocarbons, such as benzene, toluene, and xylene; and halogenated hydrocarbons, such as methylene chloride, chloroform, trichloroethylene, perchloroethylene, 1,2-dichloroethane, chlorobenzene, bromobenzene, and chlorotoluenes.

The carboxylic acid salts of the rare earth elements are represented by the general formula (XXXI):

$$(R^{63}-CO_2)_3M \quad (XXXI)$$

where $R^{53}$ is a hydrocarbon group having 1 to 20 carbon atoms; M is a lanthanoid rare earth element compound of atomic number 57 to 71 in the periodic table. $R^{29}$ may be saturated or unsaturated, is preferably an alkyl or alkenyl group, and may be linear, branched, or cyclic. The carboxyl group is bonded to a primary, secondary, or tertiary carbon atom. Examples of the carboxylic acid salts include salts of octanoic acid, 2-ethylhexanoic acid, oleic acid, neodecanoic acid, stearic acid, benzoic acid, naphthenic acid, and Versatic acid (trade name by Shell Chemical Company: carboxylic acid of which a carboxyl group is bonded to a tertiary carbon atom). Among them preferred are salts of 2-ethylhexanoic acid, neodecanoic acid, naphthenic acid, and Versatic acid.

The alkoxides of the rare earth elements are represented by the general formula (XXXII):

$$(R^{64}O)_3M \quad (XXXII)$$

where $R^{64}$ is a hydrocarbon group having 1 to 20 carbon atoms; M is a lanthanoid rare earth element compound of atomic number 57 to 71 in the periodic table, Examples of alkoxy groups represented by $R^{30}O$ include 2-ethyl-hexylalkoxy group, oleilalkoxy group, stearylalkoxy group, phenoxy group, and benzylalkoxy group. Among them preferred are 2-ethyl-hexylalkoxy group and benzylalkoxy group.

Examples of the β-diketone complexes of the rare earth elements include acetylacetone complexes, benzoylacetone complexes, propionitrileacetone complexes, valerylacetone complexes, and ethylacetylacetone complexes of the rare earth elements. Among them preferred are acetylacetone complexes and ethylacetylacetone complexes.

Examples of the phosphates and phosphites of the rare earth elements include salts of the rare earth elements with bis(2-ethylhexyl) phosphate, bi (1-methylheptyl) phosphate, bis(p-nonylphenyl) phosphate, bis(polyethylene glycol-p-nonylphenyl) phosphate, bis(1-methylheptyl)(2-ethylhexyl) phosphate, bis(2-ethylhexyl)(p-nonylphenyl) phosphate, mono-2-ethylhexyl 2-ethylhexylphosphonate, mono-p-nonylphenyl 2-ethylhexylphosphonate, bis(2-ethylhexyl)phosphinic acid, bis(1-methylheptyl)phosphinic acid, bis(p-nonylphenyl)phosphinic acid, bis(1-methylheptyl)(2-ethylhexyl)phosphinic acid, and bis(2-ethylhexyl)(p-nonylphenyl)phosphinic acid. Among them preferred are salts of the rare earth elements with bis(2-ethylhexyl) phosphate, bis(1-methylheptyl) phosphate, mono-2-ethylhexyl 2-ethylhexylphosphonate, and bis(2-ethylhexyl)phosphinic acid.

Among these rare earth element containing compounds particularly proffered are phosphate salts and carboxylic acid salts of neodymium. Most preferred are branched carboxylic acid salts of neodymium 2-ethylhexanoate, neodymium neodecanoate, and neodymium Versatate.

The component (A) may be a reaction product of the rare earth element containing compound with a Lewis base. This reaction product exhibits improved solubility of the rare earth element containing compound in solvents due to the Lewis base and can be preserved in a stable state for a long term. The Lewis base, used for enhancing the solubility of the rare earth element containing compound in solvents and ensuring storage stability over a long term, is used in an amount of 0 to 30 mol, preferably 1 to 10 mol with respect to 1 mol of rare earth element in the form of a mixture or reaction product thereof. Examples of the Lewis bases include acetylacetone, tetrahydrofuran, pyridine, N,N-dimethylformamide, thiophene, diphenyl ether, triethylamine, organic phosphorus compounds, and monovalent or divalent alcohol.

These rare earth element containing compounds or reaction products of these compounds with the Lewis bases as component (A) may be used alone or in combination of two or more.

The component (S) in the catalyst system used for polymerization of the terminal-active polymer in the present invention is an organic aluminum compound represented by the general formula (XXVII):

$$AlR^{60}R^{61}R^{62} \quad (XXX)$$

where $R^{60}$ and $R^{61}$ may be the same or different and are each a hydrocarbon group having 1 to 10 carbon atoms or a hydrogen atom; $R^{62}$ is a hydrocarbon group having 1 to 10 carbon atoms; and $R^{62}$ may be the same or different from $R^{60}$ or $R^{61}$. Examples of the organic aluminum compounds represented by the formula (XXX) include trimethyl aluminum, triethyl aluminum, tri-n-propyl aluminum, triisopropyl aluminum, tri-n-butyl aluminum, triisobutyl aluminum, tri-t-butyl aluminum, tripentyl aluminum, trihexyl aluminum, tricyclohexyl aluminum, and trioctyl aluminum; diethylaluminum hydride, di-n-propylaluminum hydride, di-n-butylaluminum hydride, diisobutylaluminum hydride, dihexylaluminum hydride, diisohexylaluminum hydride, dioctylaluminum hydride, and diisooctylaluminum hydride; ethylaluminum dihydride, n-propylaluminum dihydride, and isobutylaluminum dihydride. Among them preferred are triethylaluminum, triisobutyl aluminum, diethylaluminum hydride, and diisobutylaluminum hydride. These organic aluminum compounds as component (B) may be used alone or in combination of two or more.

In the present invention, the component (C) in the catalyst system used for polymerization of the terminal-active polymer is at least one halide selected from the group consisting of Lewis acids, complexes of metal halides and Lewis bases, organic compounds containing active halogens.

The Lewis acid is Lewis acidic and soluble in hydrocarbons. Examples of such compounds include methylaluminum dibromide, methylaluminum dichloride, ethylaluminum dibromide, ethylaluminum dichloride, butylaluminum dibromide, butylaluminum dichloride, dimethylaluminum bromide, dimethylaluminum chloride, diethylaluminum bromide, diethylaluminum chloride, dibutylaluminum bromide, dibutylaluininum chloride, methylaluminum sesquichloride, methylaluminum sesquibromide, ethylaluminum sesquichloride, ethylaluminum sesquibromide, dibutyltin dichloride, aluminum tribromide, antimony trichloride, antimony pentachloride, phosphorus trichloride, phosphorus pentachloride, tin tetrachloride, and silicon tetrachloride. Among them preferred are diethylaluminum chloride, ethylaluminum sesquibromide, ethylaluminum dichloride, diethylaluminum bromide, ethylaluminum sesquichloride, and ethylaluminum dibromide.

Also, reaction products of alkylaluminums and halogen, such as triethylaluminum, and bromine may be used.

Examples of the metal halides contained in the complexes of the metal halides and Lewis bases include beryllium chloride, beryllium bromide, beryllium iodide, magnesium chloride, magnesium bromide, magnesium iodide, calcium chloride, calcium bromide, calcium iodide, barium chloride, barium bromide, barium iodide, zinc chloride, zinc bromide, zinc iodide, cadmium chloride, cadmium bromide, cadmium iodide, mercury chloride, mercury bromide, mercury iodide, manganese chloride, manganese bromide, manganese iodide, rhenium chloride, rhenium bromide, rhenium iodide, copper chloride, copper iodide, silver chloride, silver bromide, silver iodide, gold chloride, gold iodide, and gold bromide. Among them preferred are magnesium chloride, calcium chloride, barium chloride, manganese chloride, zinc chloride, and copper chloride, and particularly preferred are magnesium chloride, manganese chloride, zinc chloride, and copper chloride.

preferred examples of the Lewis bases to form complexes with the metal halides include phosphorus compounds, carbonyl compounds, nitrogen compounds, ether compounds, and alcohols. Examples of such preferred compounds include tributyl phosphate, tri-2-ethylhexyl phosphate, triphenyl phosphate, tricresyl phosphate, triethylphosphine, tributylphosphine, triphenylphosphine, diethylphosphinoethane, diphenylphosphinoethane, acetylacetone, benzoylacetone, propionitrileacetone, valerylacetone, ethylacetylacetone, methyl acetoacetate, ethyl acetoacetate, phenyl acetoacetate, dimethyl malonate, diethyl malonate, diphenyl malonate, acetic acid, octanoic acid, 2-ethylhexanoic acid, oleic acid, stearic acid, benzoic acid, naphthenic acid, Versatic acid, triethylamine, N,N-dimethylacetamide, tetrahydrofuran, diphenyl ether, 2-ethylhexyl alcohol, oleyl alcohol, stearyl alcohol, phenol, benzyl alcohol, 1decanol, and lauryl alcohol.

Among them more preferred are tri(2-ethylhexyl) phosphate, tricresyl phosphate, acetylacetone, 2-ethylhexanoic acid, Versatic acid, 2-ethylhexyl alcohol, 1-decanol, and lauryl alcohol.

The Lewis base is allowed to react in an amount of 0.01 to 30 mol, preferably 0.5 to 10 mol for 1 mol of metal halide. The use of the reaction product with the Lewis base can reduce the residual metal remaining in the polymer.

Examples of the organic compounds containing active halogens include benzyl chloride.

In the present invention, preferably, the catalyst system used in the polymerization of the terminal-active polymer contains an organic aluminamoxy compound, so called aluminoxane, as the component (D), in addition to the components (A) to (C). Examples of aluminoxanes include methylaluminoxane, ethylaluminoxane, propyaluminoxane, butylaluminoxane, and chloroaluminoxane. The addition of aluminoxane as the component (D) achieves a narrow molecular weight distribution and enhances the catalytic activity.

The amount and proportion of each component in the catalyst system used in the present invention may be determined depending on the purpose and necessity. Preferably, the component (A) is used in an amount of 0.00001 to 1.0 mM (mM=mmole), more preferably 0.0001 to 0.5 mM for 100 g of conjugated diene compound. The amount of the component (A) within this range ensures polymerization activity and requires no deashing process.

The molar ratio of the component (A) to the component (B) is 1:1 to 1:700 and preferably 1:3 to 1:500.

The molar ratio of halogen in the component (A) to that in the component (C) is 1:0.1 to 1:30, preferably 1:0.2 to 1:15, and more preferably 1:2.0 to 1:5.0.

The molar ratio of aluminum in the component (D) to the component (A) is 1:1 to 700:1, preferably 3:1 to 500:1. These ranges on the amounts and proportions of the catalysis components highly enhance the activity of the catalyst and require no process to remove the catalyst residue.

In addition to the components (A) to (C), the polymerization may be carried out in the presence of gaseous hydrogen in order to regulate the molecular weight of the polymer.

In addition to the components (A), (B), (C), conjugated diene compounds such as 1,3-butadiene may be added in a small amount, more specifically, 0 to 1000 mol for 1 mol of component (A) as a further catalyst component, if necessary. Although the conjugated diene compounds such as 1,3-butadiene are not essential components for the catalyst, the use of these components further enhances catalytic activity.

The catalyst is prepared by, for example, dissolving the components (A) to (C) in a solvent, and optionally allowing to react with conjugated diene compounds such as 1,3-butadiene, if necessary.

The order of the addition of these components is not limited. Furthermore, aluminoxane may be added as the component (D). In view of high polymerization activity and short polymerization induction time, it is preferred that these components be preliminarily mixed, allowed to react, and aged. The ageing temperature is typically about 0 to 100° C., and preferably 20 to 80° C. Below 0° C., aging may be insufficient. Above 100° C., catalytic activity may decrease and the molecular weight distribution may become broad.

The aging time is not limited, and can be carried out by contact in the line before feeding into a polymerization reactor. In general, aging can be achieved for at least 0-5 minutes and the resulting catalyst is stable for several days

[Preparation of Polymer Having Active Organic Metal Site]

In the preparation of the polymer having the active organic metal site, the conjugated diene compound is preferably solution-polymerized using the catalyst system containing a lanthanoid rare earth element compound in an organic solvent. In the solution polymerization, the solvent used is an inactive organic solvent. Examples of the inactive organic solvents include saturated aliphatic hydrocarbons having 4 to 10 carbon atoms, such as butane, pentane, hexane, and heptane; saturated alicyclic hydrocarbons having 5 to 20 carbon atoms, such as cyclopentane and cyclohexane; monoolefins such as 1-butene and 2-butene; aromatic hydrocarbons such as benzene, toluene and xylene; halogenated hydrocarbons, such as methylene chloride, chloroform, carbon tetrachloride, trichloroethylene, perchloroethylene, 1,2-dichloroethane, chlorobenzene, bromobenzene, and chlorotoluene. Among them preferred are aliphatic hydrocarbons and alicyclic hydrocarbons having 5 to 6 carbon atoms. These solvent may be used alone or in combination of two or more.

Examples of the monomers used in the polymerization include 1,3-butadiene, isoprene, 1,3-pentadiene, and 2,3-dimethyl-1,3-butadiene. Preferred are 1,3-butadiene and isoprene, and particularly preferred is 1,3-butadiene. These may be used alone or in combination.

The concentration of the monomer in the solvent is preferably 5 to 50 mass percent, and more preferably 10 to 30 mass percent.

The polymer having the active organic metal site must be prepared at a temperature of 25° C. or less, and preferably in the range of 10 to −78° C. At a temperature above 25° C., the polymerization reaction cannot be adequately controlled, resulting in a decrease in the cis-1,4 bond content and an increase in the vinyl bond content in the conjugated diene polymer. At a temperature below −78° C., which is below the solidification temperature of the solvent, polymerization cannot be carried out.

The polymer having the active organic metal site may be prepared by either a batch or continuous process. In order to prevent deactivation of the rare earth element catalyst and the polymer during the preparation of the conjugated diene polymer, contamination of the polymerization reaction system by deactivating compounds such as oxygen, water, and carbon dioxide must be suppressed as much as possible.

In the present invention, the resulting polymer having the active organic metal site is allowed to react with the modifier components (a) to (j) in a stoichiometrical amount or an excess amount with respect to the active organic metal site of the polymer so that the active terminal bonded to the polymer reacts with the modifier components.

In the present invention, after the modification, any known antioxidant and alcohol to terminate the polymerization may be added, if necessary.

The modification process follows known post-processes such as solvent removal to recover the intended modified conjugated diene polymer.

[Modified Conjugated Diene Polymer]

In the modified conjugated diene polymer of the present invention, the modification efficiency is not less than 40%, and the microstructure of the butadiene moiety determined by the Fourier transform infrared spectroscopy must satisfy the relationship (I):

$$\text{cis-1,4 bond content} \geq 98.00(\%) \qquad (I)$$

In addition, the modified conjugated diene polymer preferably has a ratio (mw/Mn) of the weight average molecular weight (Mw) to the number average molecular weight (Mn), in other words, a molecular weight distribution (Mw/Mn) in the range of 1.6 to 3.5, and more preferably 1.6 to 2.7.

The weight average molecular weight (Mw) and the number average molecular weight (Mn) are determined using a polystyrene calibration curve by gel permeation chromatography (GPC).

Controlling the molecular weight distribution (Mw/Mn) of the modified conjugated diene polymer within the range facilitates kneading of a rubber composition containing this modified conjugated diene polymer with high processability, resulting in excellent mechanical characteristics of the rubber composition.

The number average molecular weight (Mn) of the modified conjugated diene polymer of the present invention is preferably in the range of 100,000 to 500,000, and more preferably 150,000 to 300,000. Controlling the number average molecular weight of the modified conjugated diene polymer within this range ensures high abrasion resistance of vulcanized rubber without a significant decrease in elastic moduls and a significant increase in hysteresis loss, Furthermore, a rubber composition containing the modified conjugated diene polymer exhibits excellent kneading processability. A number average molecular weight exceeding 500,000 cannot satisfy the essential requirement of the present invention, that is, a terminal modification efficiency of the modified conjugated diene polymer of not less than 40%, in some cases.

Preferably, the modified conjugated diene polymer of the present invention contains 80 to 100 mass percent of 1,3-butadiene monomer unit and 20 to 0 mass percent of other monomer unit copolymerizable with 1,3-butadiene More preferably, the modified conjugated diene polymer of the present invention consists of 1,3-butadiene monomer unit only, that is, the diene polymer is polybutadiene rubber (BR).

Examples of the other monomers copolymerizable with 1,3-butadiene include conjugated diene compounds having 5 to 8 carbon atoms and aromatic vinyl compounds. Among them, conjugated diene compounds having 5 to 8 carbon atoms are particularly preferred. Examples of the conjugated diene compounds having 5 to 8 carbon atoms include 2-methyl-1,3-butadiene, 2,3-dimethyl-1,3-butadiene, 1,3-pentadiene, and 1,3-hexadiene. Examples of the aromatic vinyl compounds include styrene, p-methylstyrene, α-methylstyrene, and vinylnaphthalene.

[Rubber Composition]

The rubber composition of the present invention must contain 10 mass percent or more of the modified conjugated diene polymer in the entire rubber component. At a content of the modified conjugated diene polymer of 10 mass percent or more in the entire rubber component, the composition exhibits satisfactory interaction with fillers. The content of the modified conjugated diene polymer in the entire rubber component is preferably in the range of 30 to 100 mass percent, and more preferably 40 to 100 mass percent.

The modified conjugated diene polymers may be used alone or in combination of two ore more different types. Rubber components used together with modified conjugated diene polymer, if necessary, are natural rubber and synthetic diene rubbers. Examples of the synthetic diene rubbers include styrene-butadiene copolymers (SBR), polybutadiene (BR), polyisoprene (IR), butyl rubber (IIR), ethylene-propylene copolymers and mixtures thereof. These rubber may contain a partially branched structure that is introduced by multifunctional modifiers, such as tin tetrachloride.

The rubber composition of the present invention may contain carbon black or combination of carbon black and inorganic fillers as reinforcing fillers. Any carbon black conventionally used as reinforcing agents for rubber can be used without restriction, Examples of the carbon black include FEF, SRF, HAF, ISAF, and SAF. Preferably, carbon black has a iodine adsorption number (IA) of not less than 60 mg/g and a dibutyl phthalate number (DBP) of not less than 80 mL/100 g. The use of such carbon black significantly improves mechanical characteristics. In particular, HAF, ISAF, and SAF, which exhibits high abrasion resistance, are preferred.

The inorganic fillers used in the invention are silica and/or compounds represented by the general formula (XXXIII):

$$mM^1 \cdot xSiO_y \cdot zH_2O \qquad (XXXIII)$$

In the formula (XXXIII), $M^1$ is at least one selected from a metal selected from aluminum, magnesium, titanium, calcium, and zirconium, oxides and hydroxides thereof, hydrates thereof, and carbonates thereof; and m, x, y, and z are each an integer of 1 to 5, an integer of 0 to 10, an integer of 2 to 5, and an integer of 0 to 10, respectively. In the formula, if both x and z equal to 0, the inorganic compound is at least one of metals selected from aluminum, magnesium, titanium, calcium, and zirconium, oxides thereof, and hydroxides thereof.

Examples of the inorganic fillers represented by the formula (XXXIII) includes alumina ($Al_2O_3$), e.g. γ-alumina, α-alumina; alumina monohydrate ($Al_2O_3 \cdot H_2O$), e.g. boehmite and diaspore; aluminum hydroxide [$Al(OH)_3$], e.g. gibbsite and bayerite; aluminum carbonate [$Al_2(CO_3)_2$], magnesium hydroxide [$Mg(OH)_2$], magnesium oxide (MgO), magnesium carbonate ($MgCO_3$), talc ($3MgO \cdot 4SiO_2 \cdot H_2O$), attapulgite ($5MgO \cdot 8SiO_2 \cdot 9H_2O$), titanium white ($TiO_2$), titanium black ($TiO_{2n-1}$), calcium oxide (CaO), calcium hydroxide [$Ca(OH)_2$], aluminum magnesium oxide ($MgO \cdot Al_2O_3$), clay ($Al_2O_3 \cdot 2SiO_2$), kaolin ($Al_2O_3 \cdot 2SiO_2 \cdot 2H_2O$), pyrophyylite ($Al_2O_3 \cdot 4SiO_2 \cdot H_2O$), bentonite ($Al_2O_3 \cdot 4SiO_2 \cdot 2H_2O$), aluminum silicate (e.g. $Al_2SiO_5$ and $Al_4 \cdot 3SiO_4 \cdot 5H_2O$), magnesium silicate (e.g. $Mg_2SiO_4$ and $MgSiO_3$), calcium silicate (e.g. $Ca_2SiO_4$), aluminum calcium silicate (e.g. $Al_2O_3 \cdot CaO \cdot 2SiO_2$), magnesium calcium silicate ($CaMgSiO_4$), calcium carbonate ($CaCO_3$), zirconium oxide ($ZrO_2$), zirconium hydroxide [$ZrO(OH)_2 \cdot nH_2O$], zirconium carbonate [$Zr(CO_3)_2$], and crystalline aluminosilicates containing hydrogen, alkali metal, or alkaline earth metal correcting charge, e.g. various zeolites. Preferably, $M^1$ in the formula (XXXIII) is at least one selected from aluminum metal, aluminum oxide, aluminum hydroxide, hydrates thereof, and aluminum carbonate.

The inorganic compounds represented by the formula (XXXIII) may be used alone or in combination of two or more. These compounds may be used together with silica.

The most preferred inorganic filler is silica in the present invention. The type of the silica is not limited, and any type of silica conventionally used as a reinforcing filler for rubber may be used.

Examples of silica include wet silica (aqueous silicic acid), dry silica (silica anhydride), calcium silicate, and aluminum silicate. Among them most preferred is wet silica, which exhibits significant compatibility between failure characteristics and wet grip.

In the case of combined use of carbon black and inorganic fillers in the present invention, the weight ratio is preferably 95:5 to 5:95 in view of performance.

Preferably, the reinforcing filler is compounded in an amount of 10 to 100 parts by mass to 100 parts by mass of rubber components. An amount of the reinforcing filler of 10 parts by mass or more to the rubber components ensures high reinforcing and other mechanical characteristics. An amount of 100 parts by mass or less ensures high processability. An amount in the range of 20 to 80 parts by mass are particularly preferred in view of reinforcing and other mechanical characteristics and processability.

In the case of use of the silica as a reinforcing filler in the rubber composition of the present invention, any silane coupling agent may be compounded in order to further improve reinforcing characteristics. Examples of the silane coupling agents include bis(3-triethoxysilylpropyl)tetrasulfide, bis(3-triethoxysilylpropyl)trisulfide, bis(3-triethoxysilylpropyl) disulfide, bis(2-triethoxysilylethyl)tetrasulfide, bis(3-trimethoxysilylpropyl)tetrasulfide, bis(2-trimethoxysilylethyl) tetrasulfide, 3-mercaptopropyltrimethoxysilane, 3-mercaptopropyltriethoxysilane, 2-mercaptoethyltrimethoxysilane, 2-mercaptoethyltriethoxysilane, 3-trimethoxysilylpropyl-N,N-dimethylthiocarbaroyl tetrasulfide, 3-triethoxysilylpropyl-N,N-dimethylthiocarbamoyl tetrasulfide, 3-triethoxysilylethyl-N,N-dimethylthiocarbamoyl tetrasulfide, 3-trimethoxysilylpropylbenzothiazole tetrasulfide, 3-triethoxysilylpropylbenzothiazole tetrasulfide, 3-triethoxysilylpropylmethacrylate monosulfide, 3-trimethoxysilylpropylmethacrylate monosulfide, bis(3-diethoxymethylsilylpropyl) tetrasulfide, 3-mercaptopropyldimethoxymethylsilane, dimethoxymethylsilylpropyl-N,N-dimethylthiocarbamoyl tetrasulfide, and dimethoxymethylsilylpropylbenzothiazole tetrasulfide. Among these preferred are bis(3-triethoxysilylpropyl) tetrasulfide, and 3-trimethoxysilylpropylbenzothiazolyl tetrasulfide in view of reinforcing characteristics, These silane coupling agents may be used alone or in combination of two or more.

The preferred amount of the silane coupling agent compounded in the rubber composition of the present invention is determined within the range of 1 to 20 mass percent, although it depends on the type of the silane coupling agent. Controlling within this range ensures the effect of the coupling agent without gelation of the rubber component. The more preferred amount of the silane coupling agent is in the range of 5 to 15 mass percent in view of the more significant effect of the coupling agent without gelation.

The rubber composition of the present invention may further contain various additives generally used in rubber industries, such as vulcanizing agents, vulcanization accelerators, process oils, antioxidants, antiscorching agents, zinc oxide, and stearic acid within the scope of the present invention.

The rubber composition of the present invention is generally sulfur-crosslinkable. Sulfur is preferably used as a vulcanizing agent. The amount on the basis of elemental sulfur of the vulcanizing agent used is preferably 0.1 to 10.0 parts by mass, and more preferably 1.0 to 5.0 parts by mass to 100 parts by mass of rubber component. At 0.1 parts by mass or more, the vulcanized rubber exhibits high rupture strength, high abrasion resistance, and low heat build-up. At 10.0 parts by mass or less, the rubber elasticity is satisfactory.

Examples of the vulcanization accelerators used in the present invention include, but not limited to, thiazoles, such as M (2-mercaptobenzothiazole), DM (dibenzothiazyl disulfide), and CZ (N-cyclohexyl-2-benzothiazole sulfenamide); and guanidines, such as DPG (diphenylguanidine). The vulcanizing agents is compounded in an amount of preferably 0.1 to 5.0 parts by mass and more preferably 0.2 to 3.0 parts by mass to 100 parts by mass.

Examples of process oil that may be compounded in the rubber composition of the present invention include paraffinic oils, naphthenic oils, and aromatic oils. Preferred oils are aromatic oils for application requiring high tensile strength and abrasion resistance, or naphthenic oils or paraffinic oils for application requiring low hysteresis loss and excellent low-temperature characteristics. The amount of process oil is preferably in the range of 0 to 100 parts by mass to 100 parts by mass. At an amount of 100 parts by mass or less, the vulcanized rubber can maintain high tensile strength and low heat build-up.

Examples of the antioxidants that can be compounded in the rubber composition of the present invention include 3C (N-isopropyl-N'-phenyl-p-phenylenediamine, 6C(N-(1,3-dimethylbutyl)-N'-phenyl-p-phenylenediaminel, AW (6-ethoxy-2,2,4-trimethyl-1,2-dihydroquinoline), and high-temperature condensate of diphenylamine and acetone. The amount of the antioxidant is preferably 0.1 to 5.0 parts by mass and more preferably 0.3 to 3.0 parts by mass to 100 parts by mass.

The rubber composition of the present invention is prepared by kneading raw materials with a kneader such as a roll or an internal mixer according to the compounding formulations described above, building a green tire, and vulcanizing it. The rubber composition can be applied to tire components such as tire tread, under tread, side wall, carcass coating rubber, belt coating rubber, bead filler, chafer, and bead coating rubber; and industrial products such as rubber vibration isolators, belts, and hoses. In particular, the composition can be preferably used as tire tread rubber.

The tire of the present invention is produced by any conventional process using the rubber composition of the present invention. In detail, an unvulcanized rubber composition containing various additives according to the present invention is processed into various rubber components. These components are assembled on a tire building drum in any conventional manner into a green tire. The green tire is vulcanized by applying heat and pressure in a vulcanization mold into a vulcanized rubber product.

The resulting tire of the present invention exhibits significantly low fuel consumption, satisfactory failure characteristics, and high abrasion resistance. Furthermore, since this rubber composition has high processability, the tire can be produced with high productivity.

EXAMPLES

The present invention is described in more detail by examples, but should not be limited by these examples.

The properties of the polymers were determined according to the following methods.
<<Properties of Polymer>>
<Microstructure Analysis by FT-IR>
The analysis was carried out according to the method described above.
<Determination of Number Average Molecular Weight (Mn), Weight Average Molecular Weight (Mw), and Molecular Weight Distribution (Mw/Mn)>
These were determined with a GPC [made by Tosoh Corporation, HLC-8020] provided with a refractometer as a detector from a calibration curve obtained from monodispersion polystyrene standard samples. The column used was GMHXL [made by Tosoh Corporation], and the eluting solvent was tetrahydrofuran
<Terminal Modification Efficiency>
The terminal modification efficiency was determined according to the method described above.
The low-loss characteristic of the vulcanized rubber was determined as follows:
<<Mechanical Properties>>
<Low-Loss Characteristic>
Using a viscoelasticity measuring instrument (made by Rheometrix Scientific Inc.), tan δ (50° C.) was measured at a temperature of 50° C., a strain of 5%, and a frequency of 15 Hz The reciprocal number of tan δ (50° C.) was calculated and indexed by the value (100) of Comparative Example. A larger index indicates a lower heat build-up characteristic.
<Abrasion Resistance>
The abrasion loss was measured using a Lambourn abrasion tester at room temperature. The reciprocal number of the abrasion loss was calculated and indexed by the value (100) of Comparative Example. A larger index indicates a lower abrasion less, that is, high abrasion resistance.
<Crack Resistance>
The crack resistance of samples of vulcanized rubber compositions was measured at 40° C. according to JIS K6260. The results were indexed by the value (100) of Comparative Example. A larger index indicates higher crack resistance.

Production Example 1

Preparation of Catalyst A

Into a 100-mL dried nitrogen-purged glass vessel with a rubber stopper, a solution of butadiene (7.11 g, 15.2 mass percent) in cyclohexane, a solution of 0.59 mL of neodymium neodecanoate (0.56 mol/L) in cyclohexane, a solution (10.32 mL) of methylaluminoxane MAO in toluene (PMAO made by Tosoh Akzo Co., Ltd.) (aluminum concentration: 3.23 mol), and a solution (7.77 mL) of diisobutylaluminum hydride (made by Kanto Chemical Co., Inc.) in hexane (0.90 mol/L) were fed in this order. After the mixture was aged at room temperature for 2 minutes, a solution (1.45 mL) of diethylaluminum chloride (made by Kanto Chemical Co., Inc.) in hexane (0.95 mol/T) was added, followed by aging with stirring occasionally at room temperature for 15 minutes. The concentration of neodymium in the resulting catalyst solution was 0.011 mol/L.

Production Example 2

Preparation of Catalyst B

Into a 100-mL dried nitrogen-purged glass vessel with a rubber stopper, a solution of butadiene (7-11 g, 15.2 mass percent) in cyclohexane, a solution (0.59 mL) of neodymium neodecanoate (0.56 mol/L) in cyclohexane, a solution (10.32 mL) of methylaluminoxane MAO in toluene (PMAO made by Tosoh Akzo Co., Ltd.) (aluminum concentration: 3.23 mol), and a solution (7.77 mL) of diisobutylaluminum hydride (made by Kanto Chemical Co., Inc.) in hexane (0.90 mol/L) were fed in this order. After the mixture was aged at room temperature for 4 minutes, a solution (2.36 mL) of diethylaluminum chloride (made by Kanto Chemical Co., Inc.) in hexane (0.95 mol/L) was added, followed by aging with stirring occasionally at room temperature for 15 minutes. The concentration of neodymium in the resulting catalyst solution was 0.011 mol/L.

Production Example 3

Preparation of Catalyst C

Into a 100-mL dried nitrogen-purged glass vessel with a rubber stopper, a solution of butadiene (7.11 g, 15.2 mass percent) in cyclohexane, a solution (0.59 mL) of neodymium neodecanoate (0.56 mol/L) in cyclohexane, a solution (10.32 mL) of methylaluminoxane MAO in toluene (PMAO made by Tosoh Akzo Co., Ltd.) (aluminum concentration: 3.23 mol), and a solution (7.77 mL) of diisobutylaluminum hydride (made by Kanto Chemical Co., Inc.) in hexane (0-90 mol/L) were fed in this order. After the mixture was aged at room temperature for 2 minutes, a solution (0.73 mL) of diethylaluminum chloride (made by Kanto Chemical Co., Inc.) in hexane (0.95 mol/L) was added, followed by aging with stirring occasionally at room temperature for 15 minutes. The concentration of neodymium in the resulting catalyst solution was 0.011 mol/L.

Production Example 4

Preparation of Catalyst D

Into a 100-mL dried nitrogen-purged glass vessel with a rubber stopper, a solution (40.00 mL) of diisobutylaluminum hydride (made by Kanto Chemical Co., Inc.) in hexane (0.93 M (M=mole)) were fed, and then 1.48 mL of neodymium neodecanoate (0.73 M) in cyclohexane solution was added dropwise. The mixture was allowed to react at room temperature until the solution became homogeneous. Tributylphosphine (5.4 µM) was added followed by aging for several minutes.

Production Example 5

Preparation of Catalyst E

Into a 100-mL dried nitrogen-purged glass vessel with a rubber stopper, a cyclohexane solution of 7.11 g of butadiene (15.2 weight percent), a solution (0.59 mL) of neodymium neodecanoate (0.56 M) in cyclohexane, a solution (10.32 mL) of methylaluminoxane MAO in toluene (PMAO made by Tosoh Akzo Co., Ltd.) (aluminum concentration: 3.23 M), and 7.77 mL of hexane solution of diisobutylaluminum hydride (made by Kanto Chemical Co., Inc.) (0.90 M) were fed in this order, After the mixture was aged at room temperature for 2 minutes, a solution (0.54 mL) of diethylaluminum chloride (made by Kanto Chemical Co., Inc.) in hexane (0.95 M) was added, followed by aging with stirring occasionally at room temperature for 15 minutes. The concentration of neodymium in the resulting catalyst solution was 0.011 M (mol/L).

Production Example 6

Preparation of Polymer A

Into a 1-L dried nitrogen-purged glass vessel with a rubber stopper, a dried purified butadiene solution in cyclohexane and dried cyclohexane were fed such that 400 g of cyclohexane solution containing 12.0 mass percent butadiene was placed.

Next, 1.56 mL (neodymium content: 0.017 mM) of catalyst A prepared in advance was fed, and the monomer was polymerized in a water bath at 50° C. for 1.5 hours. In order to terminate the polymerization reaction, a solution (2 mL) of 5 mass percent antioxidant 2,2'-methylene-bis(4-ethyl-6-t-butylphenol) (hereinafter, referred to as NS-5) in isopropyl alcohol was fed at 50° C., and the polymer was precipitated in isopropyl alcohol containing a small amount of NS-5. The product was dried on a drum drier to recover a polymer A at a yield of substantially 100%.

Production Example 7

Preparation of Polymer B

Into a 1-L dried nitrogen-purged glass vessel with a rubber stopper, a dried purified butadiene solution in cyclohexane and dried cyclohexane were fed such that 400 g of cyclohexane solution containing 5.0 mass percent butadiene was placed.

Next, 1.56 ml (neodymium content: 0.017 mM) of catalyst A prepared in advance was fed, and the monomer was polymerized in a water bath at 10° C. for 3.5 hours. In order to terminate the polymerization reaction, a solution (2 mL) of 5 mass percent antioxidant NS-5 in isopropyl alcohol was fed at 50° C., and the polymer was precipitated in isopropyl alcohol containing a small amount of NS-5. The product was dried on a drum drier to recover a polymer B at a yield of substantially 100%.

Production Example 8

Preparation of Polymer C

Into a 1-L dried nitrogen-purged glass vessel with a rubber stopper, a dried purified butadiene solution in cyclohexane and dried cyclohexane were fed such that 400 g of cyclohexane solution containing 5.0 mass percent butadiene was placed.

Next, 1.56 mL (neodymium content; 0.017 mM) of catalyst B prepared in advance was fed, and the monomer was polymerized in a water bath at 10° C. for 4 hours. In order to terminate the polymerization reaction, a solution (2 mL) of 5 mass percent antioxidant NS-5 in isopropyl alcohol was fed at 50° C., and the polymer was precipitated in isopropyl alcohol containing a small amount of NS-5. The product was dried on a drum drier to recover a polymer C at a yield of substantially 100%.

Production Example 9

Preparation of Polymer D

After polymerization in a water bath at 50° C. for 1.5 hours according to the method for the polymer A, 25 Eq of 4,4'-bis(diethylamino)benzophenone (hereinafter, referred to as DEAB) on the basis of neodymium was added followed by reaction in a water bath at 50° C. for 1 hour. A polymer D was prepared as in the polymer A.

Production Example 10

Preparation of Polymer E

After polymerization in a water bath at 10° C. for 3.5 hours according to the method for the polymer B, 25 Eq of DEAB on the basis of neodymium was added followed by gradual heating for reaction in a water bath at 50° C. for 1 hour. A polymer E was prepared as in the polymer A.

Production Example 11

Preparation of Polymer F

After polymerization in a water bath at 10° C. for 4.0 hours according to the method for the polymer C, 25 Eq of DEAB on the basis of neodymium was added followed by gradual heating for reaction in a water bath at 50° C. for 1 hour. A polymer F was prepared as in the polymer A.

Production Example 12

Preparation of Polymer G

After polymerization in a water bath at 10° C. for 4.0 hours according to the method for the polymer C, 0.5 Eq of DEAB on the basis of neodymium was added followed by gradual heating for reaction in a water bath at 50° C. for 1 hour. A polymer G was prepared as in the polymer A.

Production Example 13

Preparation of Polymer H

Into a 1-L dried nitrogen-purged glass vessel with a rubber stopper, a dried purified butadiene solution in cyclohexane and dried cyclohexane were fed such that 400 g of cyclohexane solution containing 15.0 mass percent butadiene was placed.

Next, 1.58 mL (neodymium content: 0.017 mM) of catalyst C prepared in advance was fed, and the monomer was polymerized in a water bath at 65° C. for 1.0 hour. After 0.425 mM of DEARD was gradually fed and was gradually cooled to 50° C. for reaction for 1 hour, a solution (2 mL) of 5 mass percent antioxidant NS-5 in isopropyl alcohol was fed at 50° C. to terminate the polymerization reaction. The polymer was precipitated in isopropyl alcohol containing a small amount of NS-5. The product was dried on a drum drier to recover a polymer H at a yield of substantially 100%.

Production Example 14

Preparation of Polymer I

After polymerization in a water bath at 50° C. for 1.5 hours according to the method for the polymer A, a dioctyltin bisoctylmalate (1 Eq of on the basis of neodymium, hereinafter, referred to as DOTBOM) solution (0.2 mol/L) was added followed by reaction in a water bath at 50° C. for 1 hour. A polymer I was prepared as in the polymer A.

Production Example 15

Preparation of Polymer J

After polymerization in a water bath at 10° C. for 3-5 hours according to the method for the polymer B, a DOTBOM solution (0.2 mol/L, 1 Eq on the basis of neodymium) was added followed by gradual heating for reaction in a water bath at 50° C. for 1 hour. A polymer J was prepared as in the polymer B.

Production Example 16

Preparation of Polymer K

After polymerization in a water bath at 10° C. for 4.0 hours according to the method for the polymer C, a DOTBOM solution (0.2 mol/L, 0.75 Eq on the basis of neodymium) was added followed by gradual heating for reaction in a water bath at 50° C. for 1 hour. A polymer K was prepared as in the polymer C.

Production Example 17

Preparation of Polymer L

After polymerization in a water bath at 10° C. for 4.0 hours according to the method for the polymer C, a DOTBOM solution (0.2 mol/L, 0.25 Eq on the basis of neodymium) was added followed by gradual heating for reaction in a water bath at 50° C. for 1 hour. A polymer L was prepared as in the polymer C.

Production Example 18

Polymer M

Into a 1-L dried nitrogen-purged glass vessel with a rubber stopper, a dried purified butadiene solution in cyclohexane and dried cyclohexane were fed such that 400 g of cyclohexane solution containing 12 mass percent butadiene was placed.

Next, 1.56 mL (neodymium content: 0.017 mM) of catalyst A prepared in advance was fed, and the monomer was polymerized in a water bath at 10° C. for 3.5 hours. In order to terminate the polymerization reaction, a solution (2 mL) of 5 mass percent antioxidant 2,2'-methylene-bis(4-ethyl-6-t-butylphenol) (hereinafter, referred to as NS-5) in isopropyl alcohol was fed at 50° C., and the polymer was precipitated in isopropyl alcohol containing a small amount of NS-5. The product was dried on a drum drier to recover a polymer M at a yield of substantially 100%. The analytical results of the polymer are shown in Table 4.

Production Example 19

Polymer N

Polymerization was carried out in a water bath at 10° C. for 3.5 hours as in the polymer A except that 400 g of 5.0 mass percent butadiene solution was used. Then, 0.425 mM of 4,4'-bis(diethylamino)benzophenone was added and gradually heated for reaction in a water bath at 50° C. for 7 minutes. At 50° C., a solution (2 mL) of 5 mass percent antioxidant NS-5 in isopropyl alcohol was added to terminate the polymerization. The polymer was precipitated in isopropyl alcohol containing a small amount of NS-5. The product was dried on a drum drier to recover a polymer N at a yield of substantially 100%. The analytical results of the polymer are shown in Table 2.

Production Example 20

Polymer O

Polymerization was carried out in a water bath at 10° C. for 3.5 hours as in the polymer A except that 400 g of 5.0 mass percent butadiene solution was used. Then, 0.425 mM of 4,4'-bis(diethylamino)benzophenone (hereinafter referred to as DEAB) was added and gradually heated for reaction in a water bath at 50° C. for 10 minutes. At 50° C., a solution (2 mL) of 5 mass percent antioxidant NS-5 in isopropyl alcohol was added to terminate the polymerization. The polymer was precipitated in isopropyl alcohol containing a small amount of NS-5. The product was dried on a drum drier to recover a polymer O at a yield of substantially 100%. The analytical results of the polymer are shown in Table 2.

Production Example 21

Polymer P

Polymerization was carried out in a water bath at 10° C. for 3.5 hours as in the polymer A except that 400 g of 5.0 mass percent butadiene solution was used. Then, 0.425 mM of 1-butyrylaziridine (Azi) was added and gradually heated for reaction in a water bath at 50° C. for 10 minutes. At 50° C., a solution (2 mL) of 5 mass percent antioxidant NS-5 in isopropyl alcohol was added to terminate the polymerization. The polymer was precipitated in isopropyl alcohol containing a small amount of NS-5. The product was dried on a drum drier to recover a polymer P at a yield of substantially 100% The analytical results of the polymer are shown in Table 2.

Production Example 22

Polymer Q

Polymerization was carried out in a water bath at 10° C. for 3.5 hours as in the polymer A except that 400 g of 5.0 mass percent butadiene solution was used. Then, 0.425 mM of dichloronaphthoquinone (DCNQ) was added and gradually heated for reaction in a water bath at 50° C. for 10 minutes. At 50° C., a solution (2 mL) of 5 mass percent antioxidant NS-5 in isopropyl alcohol was added to terminate the polymerization. The polymer was precipitated in isopropyl alcohol containing a small amount of NS-5. The product was dried on a drum drier to recover a polymer Q at a yield of substantially 100%. The analytical results of the polymer are shown in Table 2.

Production Example 23

Polymer R

Polymerization was carried out in a water bath at 10° C. for 3.5 hours as in the polymer A except that 400 g of 5.0 mass percent butadiene solution was used. Then, 0.425 mM of DEAB was added and gradually heated for reaction in a water bath at 50° C. for 1 hour. At 50° C., a solution (2 mL) of 5 mass percent antioxidant NS-5 in isopropyl alcohol was added to terminate the polymerization. The polymer was precipitated in isopropyl alcohol containing a small amount of NS-5. The product was dried on a drum drier to recover a polymer R at a yield of substantially 100%. The analytical results of the polymer are shown in Table 2.

Production Example 24

Polymer S

Into a 1-L dried nitrogen-purged glass vessel with a rubber stopper, a dried purified butadiene solution in cyclohexane and dried cyclohexane were fed such that 400 g of cyclohexane solution containing 5.0 mass percent butadiene was placed.

Next, 1.56 mL (neodymium content: 0.017 mM) of catalyst B prepared in advance was fed, and the monomer was polymerized in a water bath at 10° C. for 4 hours. Then, 0.425 mM of DEAB was added and gradually heated for reaction in a water bath at 50° C. for 1 hour. In order to terminate the polymerization reaction, a solution (2 mL) of 5 mass percent antioxidant NS-5 in isopropyl alcohol was fed at 50° C., and the polymer was precipitated in isopropyl alcohol containing a small amount of NS-5. The product was dried on a drum drier to recover a polymer S at a yield of substantially 100%. The analytical results of the polymer are shown in Table 2.

Production Example 25

Polymer T

Into a 1-L dried nitrogen-purged glass vessel with a rubber stopper, a dried purified butadiene solution in cyclohexane and dried cyclohexane were fed such that 400 g of cyclohexane solution containing 12 mass percent butadiene was placed.

Next, 1.56 mL (neodymium content: 0.017 mM) of catalyst A prepared in advance was fed, and the monomer was polymerized in a water bath at 10° C. for 3.5 hours. Then, 0.425 mM of DEAB was added and gradually heated for reaction in a water bath at 50° C. for 10 minutes. In order to terminate the polymerization reaction, a solution (2 mL) of 5 mass percent antioxidant NS-5 in isopropyl alcohol was fed at 50° C., and the polymer was precipitated in isopropyl alcohol containing a small amount of NS-5. The product was dried on a drum drier to recover a polymer T at a yield of substantially 100%. The analytical results of the polymer are shown in Table 2.

Production Example 26

Polymer U

Polymerization was carried out in a water bath at 10° C. for 3.5 hours as in the polymer A except that 400 g of 5.0 mass percent butadiene solution was used. Then, a dioctyltin bisoctylmalate (1.1 Eq of on the basis of neodymium, hereinafter, referred to as DOTBOM) solution (0.2 mol/L) was added followed by reaction in a water bath at 50° C. for 5 minutes. At 50° C., a solution (2 mL) of 5 mass percent antioxidant NS-5 in isopropyl alcohol was added to terminate the polymerization. The polymer was precipitated in isopropyl alcohol containing a small amount of NS-5. The product was dried on a drum drier to recover a polymer U at a yield of substantially 100%. The analytical results of the polymer are shown in Table 4.

Production Example 27

Polymer V

Polymerization was carried out in a water bath at 10° C. for 3.5 hours as in the polymer A except that 400 g of 5.0 mass percent butadiene solution was used. Then, a DOTBOM (1.1 Eq of on the basis of neodymium) solution (0.2 mol/L) was added followed by reaction in a water bath at 50° C. for 10 minutes. At 50° C., a solution (2 mL) of 5 mass percent antioxidant NS-5 in isopropyl alcohol was added to terminate the polymerization. The polymer was precipitated in isopropyl alcohol containing a small amount of NS-5. The product was dried on a drum drier to recover a polymer V at a yield of substantially 100%. The analytical results of the polymer are shown in Table 4.

Production Example 28

Polymer W

Polymerization was carried out in a water bath at 10° C. for 3.5 hours as in the polymer A except that 400 g of 5.0 mass percent butadiene solution was used. Then, a DOTBOM (1.1 Eq of on the basis of neodymium) solution (0.2 mol/L) was added followed by reaction in a water bath at 50° C. for 1 hour. At 50° C., a solution (2 mL) of 5 mass percent antioxidant NS-5 in isopropyl alcohol was added to terminate the polymerization. The polymer was precipitated in isopropyl alcohol containing a small amount of NS-5. The product was dried on a drum drier to recover a polymer W at a yield of substantially 100%. The analytical results of the polymer are shown in Table 4.

Production Example 29

Comparative Example 7

Into a 1-L dried nitrogen-purged glass vessel with a rubber stopper, a dried purified butadiene solution in cyclohexane and dried cyclohexane were fed such that 400 g of cyclohexane solution having each of the concentrations shown in Table 1 was placed. Next, the catalyst D prepared in advance was fed and stirred, A solution (0.18 mL) of diethylaluminum chloride (made by Kanto Chemical Co., Inc.) in hexane (0.95 M) was added. After feeding of a modifier, the solution was gradually heated and stirred a water bath at 50° C. for 1 hour. In order to terminate the polymerization reaction, a solution (2 mL) of 5 percent antioxidant 2,2'-methylene-bis(4-ethyl-6-t-butylphenol) (NS-5) in isopropyl alcohol was fed at 50° C., and the polymer was precipitated in isopropyl alcohol containing a small amount of NS-5. The product was dried on a drum drier to recover a polymer at a yield of substantially 100%.

Production Example 30

Example 26 and Comparative Example 19

Into a 1-L dried nitrogen-purged glass vessel with a rubber stopper, a dried purified butadiene solution in cyclohexane and dried cyclohexane were fed such that 400 g of cyclohexane solution having a predetermined concentration was placed. Next, a catalyst solution prepared in advance was fed to initiate polymerization in a water bath. After feeding of a modifier 1, the solution was gradually heated and stirred in a water bath at 50° C. for 30 minutes. A solution (1.20 mL) of dibutoxy titanium bis(acetylacetonate), as a condensation promoter, in cyclohexane (1.01M) and deionized water (22 µL) were fed, followed by reaction in a water bath at 50° C. for 1 hour. In order to terminate the polymerization reaction, a solution (2 mL) of 5 percent antioxidant 2,2'-methylene-bis(4-ethyl-6-t-butylphenol) (NS-5) in isopropyl alcohol was fed at 50° C., and the polymer was precipitated in isopropyl alcohol containing a small amount of NS-5. Each product was dried on a drum drier to recover a polymer at a yield of substantially 100%.

Production Example 31

Example 27 and Comparative Example 20

Into a 1-L dried nitrogen-purged glass vessel with a rubber stopper, a dried purified butadiene solution in cyclohexane and dried cyclohexane were fed such that 400 g of cyclohexane solution having a predetermined concentration was placed. Next, a catalyst solution prepared in advance was fed to initiate polymerization in a water bath. After feeding of a modifier 1, the solution was gradually heated and stirred in a water bath at 50° C. for 30 minutes. After feeding of a modifier 2 solution in hexane, the solution was stirred at 50° C. for 30 minutes. A solution (1.20 mL) of tin bis(2-ethylhexanoate) (1.01M), as a condensation promoter, in cyclohexane and deionized water (22 µL) were fed, followed by reaction in a water bath at 50° C. for 1 hour. In order to terminate the polymerization reaction, a solution (2 mL) of 5 percent antioxidant 2,2'-methylene-bis(4-ethyl-6-t-butylphenol) (NS-5) in isopropyl alcohol was fed at 50° C., and the polymer was precipitated in isopropyl alcohol containing a small amount of NS-5. Each product was dried on a drum drier to recover a polymer at a yield of substantially 100%.

Production Example 32

Comparative Example 22

Into a 1-L dried nitrogen-purged glass vessel with a rubber stopper, 130 g of toluene, A solution of methylaluminoxane MAO (PMAO made by Tosoh Akzo Co., Ltd.) in toluene (aluminum concentration: 33.5M), and 2-methoxyethylcyclopentadienyltrichlorotitanium (0.0335 mM) was fed in this order. After aging at room temperature for 10 minutes, the mixture was maintained at −25° C. (catalyst F) A solution (60 g) of dried purified butadiene (25 weight %) in cyclohexane was added to the catalyst F solution, followed by polymerization at room temperature for 30 minutes. After addition of a modifier, the solution was gradually heated and was stirred in a water bath at 50° C. for 1 hour. In order to terminate the polymerization reaction, a solution (2 mL) of 5 percent antioxidant 2,2'-methylene-bis(4-ethyl-6-t-butylphenol) (NS-5) in isopropyl alcohol was fed at 50° C., and the polymer was precipitated in isopropyl alcohol containing a small amount of NS-5. The product was dried on a drum drier to recover a polymer at a yield of substantially 100%.

Production Example 33

Other Polymers

According to the type and amount (mL) of the catalyst, the concentration of the monomer solution (mass percent), the polymerization temperature (° C.), the polymerization time (h), and the type and the amount (mM) of the modifier described in Tables 4, 5, and 7, a dried purified butadiene solution in cyclohexane and dried cyclohexane were fed into a 1-L dried nitrogen-purged glass vessel with a rubber stopper such that 400 g of cyclohexane solution having a predetermined concentration was placed. Next, a catalyst prepared in advance was fed followed by polymerization in a water bath. After feeding of a modifier, the solution was gradually heated and stirred a water bath at 50° C. for 1 hour In order to terminate the polymerization reaction, a solution (2 mL) of 5 percent antioxidant 2,2'-methylene-bis(4-ethyl-6-t-butylphenol) (NS-5) in isopropyl alcohol was fed at 50° C., and the polymer was precipitated in isopropyl alcohol containing a small amount of NS-5. Each product was dried on a drum drier to recover a polymer at a yield of substantially 100%.

Examples 1 to 3 and Comparative Examples 1 to 7

Using the polymers A to H prepared through Production Examples 6 to 13, high-cis polybutadiene rubber 150L made by Ube Industries, Ltd., and the polymer prepared through Production Example 29, rubber compositions were prepared according to the formulation of Composition 1 shown in Table 1, and were vulcanized at 160° C. for 15 minutes to measure the mechanical properties and abrasion resistance of each vulcanized rubber. The results are shown in Table 2.

TABLE 1

| (Composition 1) | | |
|---|---|---|
| First Step (Parts by mass) | Diene polymer polybutadiene (BR) | 80.0 |
| | Polyisoprene rubber (IR) | 20.0 |
| | Carbon black (HAF) | 50.0 |
| | Stearic acid | 2.0 |
| | Softener | 10.0 |
| | Antioxidant (Suntight A) | 2.0 |
| Second Step (parts by mass) | Antioxidant (6C) | 1.0 |
| | Zinc oxide | 2.5 |
| | Vulcanization accelerator (D-G) | 0.5 |
| | Vulcanization accelerator (DM-G) | 0.3 |
| | Vulcanization accelerator (NS-G) | 0.5 |
| | Sulfur | 1.5 |

[Remarks]
Polybutadiene (BR): Conjugated diene polymer of each Production Example of the Invention
Polyisoprene rubber (IR): IR2200 made by JSR Corporation
Carbon black: SEAST® 3 (UF) made by Tokai Carbon Co. Ltd.
Antioxidant Suntight S: Microcrystalline wax made by Seiko Chemical Co. Ltd.
Antioxidant 6C: N-(1,3-dimethylbutyl)-N'-phenyl-p-phenylenediamine
Softener: Fukol AROMA #3 made by Fujikosan Co. Ltd.
Vulcanization accelerator D-G: diphenylguanidine
Vulcanization accelerator DM-P: dibenzothiazyl disulfide
Vulcanization accelerator NS-P: N-t-butyl-2-benzohiazyl sulfeneamide

TABLE 2

|  | Comparative Example 1 | Comparative Example 2 | Comparative Example 3 | Comparative Example 4 | Example 1 | Example 2 | Example 3 | Comparative Example 5 | Comparative Example 6 | Comparative Example 7 |
|---|---|---|---|---|---|---|---|---|---|---|
| Polymer | Polymer A | Polymer B | Polymer C | Polymer D | Polymer G | Polymer E | Polymer F | Polymer H | 150 L | |
| Modifier | (iPrOH) | (iPrOH) | (iPrOH) | DEAB | DEAB | DEAB | DEAB | DEAB | — | DEAB |
| Cis content % | 95.7 | 98.4 | 99.02 | 95.74 | 98.9 | 98.51 | 99.02 | 92.1 | 97.43 | 97.12 |
| Vinyl content % | 0.47 | 0.18 | 0.14 | 0.48 | 0.25 | 0.21 | 0.13 | 1.2 | 1.5 | 1.32 |
| Terminal modification efficiency | 0 | 0 | 0 | 70 | 40 | 95 | 95 | 40 | 0 | 72 |
| Mw/Mn | 1.76 | 2.28 | 2.3 | 1.79 | 2.29 | 2.35 | 2.35 | 1.98 | 2.19 | 3.82 |
| Catalyst (Fed amount mL) | A(3.75) | A(1.56) | B(1.56) | A(3.75) | B(1.56) | B(1.56) | B(1.56) | C(3.75) | — | D(2.53) |
| Monomer solution concentration (weight %) | 12 | 5 | 5 | 12 | 5 | 5 | 5 | 15 | — | 20 |
| Polymerization temperature (° C.) | 50 | 10 | 10 | 50 | 10 | 10 | 10 | 65 | — | 60 |
| Polymerization time (h) | 1.5 | 3.5 | 4 | 1.5 | 4 | 3.5 | 4 | 1 | — | 1 |
| Modifier (mM) | 0 | 0 | 0 | 0.425 | 0.008 | 0.425 | 0.425 | 0.425 | — | 0.425 |
| Wear resistance index | 111 | 118 | 124 | 119 | 131 | 128 | 131 | 94 | 100 | 103 |
| Low-loss index | 99 | 103 | 105 | 130 | 119 | 139 | 141 | 115 | 100 | 126 |

[Remarks]
DEAB: 4,4'-bis(diethylamino)benzophenone
iPrOH: isopropyl alcohol (Terminator: terminal modification efficiency 0%)
150L: high-cis polybutadiene rubber made by Ube Industries, Ltd.

Table 2 shows the following results.

The rubber compositions (Examples 1 to 3) of the present invention, which have a high cis-1,4 bond content of not less than 98%, a low vinyl bond content of 0.3%, and a terminal modification efficiency of not less than 40%, exhibit higher abrasion resistance and superior low-loss characteristic compared to the unmodified polymers (Comparative Examples 1 to 3). Among these, Example 3 in which a base polymer (Comparative Example 3) with a cis-1,4 bond content of 98.90% is modified is higher abrasion resistance and superior low-loss characteristics compared to Comparative Example 3, regardless of a low terminal modification efficiency of 40%.

Examples 4 to 6 and Comparative Example 8

Using the polymers I to L prepared through production Examples 14 to 17, rubber compositions were prepared according to Formulation a shown in Table 3, and were vulcanized at 160° C. for 15 minutes to measure the mechanical properties and abrasion resistance of each vulcanized rubber. The results are shown in Table 4.

TABLE 3

| (Composition 2) | | |
|---|---|---|
| First Step (Parts by mass) | Diene polymer polybutadiene (BR) | 50.0 |
| | Natural rubber (NR) | 50.0 |
| | Carbon black (HAF) | 50.0 |
| | Stearic acid | 2.0 |
| | Antioxidant (Suntight A) | 2.0 |
| | Antioxidant (6C) | 1.0 |
| Second Step (parts by mass) | Zinc oxide | 2.5 |
| | Vulcanization accelerator (D-G) | 0.2 |
| | Vulcanization accelerator (DM-G) | 0.2 |
| | Vulcanization accelerator (NS-G) | 0.5 |
| | Sulfur | 1.3 |

TABLE 4

|  | Comparative Example 8 | Example 4 | Example 5 | Example 6 |
|---|---|---|---|---|
| Polymer | Polymer I | Polymer J | Polymer K | Polymer L |
| Cis content % | 95.75 | 98.39 | 99.02 | 98.91 |
| Vinyl content % | 0.47 | 0.21 | 0.12 | 0.23 |
| Terminal modification efficiency | 70 | 72 | 74 | 40 |
| Mw/Mn | 1.76 | 2.28 | 2.3 | 2.31 |
| Catalyst (Fed amount mL) | A (3.75) | A (1.56) | B (1.56) | B (1.56) |
| Monomer solution concentration (weight %) | 12 | 5 | 5 | 5 |
| Polymerization temperature (° C.) | 30 | 10 | 10 | 10 |
| Polymerization time (h) | 3.5 | 3.5 | 4 | 4 |
| [DOTBOM]/[Nd] | 1.12 | 1.12 | 1.12 | 0.64 |
| Wear resistance index | 100 | 108 | 119 | 110 |

[Remarks]
DOTBOM: dioctyltin bisoctylmalate

Table 4 shows the following results.

The polymer of Example 6, which contains DOTBOM as a modifier, and has a cis-1,4 bond content of not less than 98% and a terminal modification efficiency of 40%, exhibits a higher abrasion resistance than that of Comparative Example 8, which contains the same modifier, and has a cis-1,4 bond content of 95, 75% and a terminal modification efficiency of 70%.

Furthermore, in the comparison of Comparative Example 8 and Examples 4 and 5, which have substantially the same terminal modification efficiency (70 to 74%), the abrasion resistance is improved as the cis-1,4 bond content increases.

Examples 7 to 12 and Comparative Example 9

Rubber compositions were prepared using polymers B to H, which were prepared through Production Examples 19 to 25, according to the formulation of Composition I shown in Table 1. Each rubber composition was vulcanized at 160° C. for 15 minutes to measure the mechanical properties, abrasion resistance, and low-loss index of the vulcanized rubber. The results are shown in Table 5.

Table 6 shows the following results.

The abrasion resistance of the rubber compositions of the present invention, which contain DOTBOM as a modifier and have a terminal modification efficiency of 65% (Example 13), 75% (Example 14), or 90% (Example 15), improves as the

TABLE 5

|  | Example 7 | Example 8 | Example 9 | Example 10 | Example 11 | Example 12 | Comparative Example 9 |
|---|---|---|---|---|---|---|---|
| Polymer | Polymer N | Polymer O | Polymer P | Polymer Q | Polymer R | Polymer S | Polymer T |
| Modifier | DEAB | DEAB | Azi | DCNQ | DEAB | DEAB | DEAB |
| Cis content (%) | 98.50 | 98.48 | 98.46 | 98.53 | 98.51 | 99.02 | 97.12 |
| Vinyl content (%) | 0.21 | 0.19 | 0.18 | 0.20 | 0.21 | 0.13 | 0.42 |
| Terminal modification efficiency (%) | 70 | 75 | 75 | 75 | 95 | 95 | 69 |
| Mn × $10^3$ | 221 | 235 | 232 | 229 | 232 | 241 | 440 |
| Mw/Mn | 2.29 | 2.30 | 2.31 | 2.28 | 2.30 | 2.35 | 3.82 |
| Wear resistance index | 109 | 123 | 122 | 123 | 132 | 143 | 100 |
| Low-loss index | 102 | 118 | 118 | 114 | 131 | 134 | 100 |

[Remarks]
DEAB: 4,4'-bis(diethylamino)benzophenone
Azi: 1-butyrylaziridine
DCNQ: dichloronaphthoquinone Table 5 shows the following results.

The rubber compositions (Examples 7 to 12) of the present invention, each having a terminal modification efficiency of not less than 75%, exhibit superior abrasion resistance and low-loss index to Comparative Example 9 (terminal modification efficiency: 69%), even when any modifier is used.

Examples 13 to 15 and Comparative Example 10

Rubber compositions were prepared using polymers M and U to W, which were prepared through Production Examples 18 and 26 to 28, according to the formulation of Composition 2 shown in Table 2. Each rubber composition was vulcanized at 160° C. for 15 minutes to measure abrasion resistance and low-loss index as physical properties of the vulcanized rubber. The results are shown in Table 6.

TABLE 6

|  | Comparative Example 10 | Example 13 | Example 14 | Example 15 |
|---|---|---|---|---|
| Polymer | Polymer M | Polymer U | Polymer V | Polymer W |
| Modifier | (iPrOH) | DOTBOM | DOTBOM | DOTBOM |
| Cis content (%) | 98.51 | 98.42 | 98.40 | 98.51 |
| Vinyl content (%) | 0.20 | 0.19 | 0.18 | 0.20 |
| Terminal modification efficiency(%) | — | 65 | 75 | 90 |
| DOTBOM/Nd | — | 1.1 | 1.1 | 1.2 |
| Mn × $10^3$ | 201 | 217 | 221 | 225 |
| Mw/Mn | 2.27 | 2.26 | 2.30 | 2.31 |
| Wear resistance index | 100 | 108 | 116 | 121 | terminal modification efficiency increases, compared to unmodified Comparative Example 10.

Examples 16 to 22 and Comparative Examples 11 to 15

Rubber compositions were prepared using polymers of Examples 16 to 22 and Comparative Examples 11 to 14 and 15, which were prepared through Production Example 33, according to the formulation of Composition 3 shown in Table 7. Each rubber composition was vulcanized at 160° C. for 15 minutes to measure abrasion resistance and low-loss index as physical properties of the vulcanized rubber. The results are shown in Table 8. The modifier used was trimethylolpropane tris[3-(1-aziridinyl)propionate] (Azip), except for Comparative Example 15.

TABLE 7

| (Composition 3) | | |
|---|---|---|
| First Step (Parts by mass) | Diene polymer polybutadiene (BR) | 60.0 |
|  | Natural rubber (NR) | 40.0 |
|  | Carbon black (FEF) | 50.0 |
|  | Stearic acid | 2.0 |
|  | Antioxidant (6C) | 3.5 |
|  | Aromatic oil | 5.0 |
| Second Step (parts by mass) | Zinc oxide | 3.0 |
|  | Antioxidant NOCRAC 224 | 1.0 |
|  | Vulcanization accelerator (CZ-G) | 0.4 |
|  | Vulcanization accelerator (DM-P) | 0.2 |
|  | Sulfur | 1.4 |

TABLE 8

|  | Comparative Example 11 | Comparative Example 12 | Comparative Example 13 | Comparative Example 14 | Example 16 | Example 17 |
|---|---|---|---|---|---|---|
| Modifier | Azip | Azip | Azip | Azip | Azip | Azip |
| Cis content % | 96.05 | 95.80 | 98.06 | 98.12 | 98.10 | 98.10 |
| Vinyl content % | 0.39 | 0.45 | 0.26 | 0.31 | 0.24 | 0.29 |
| Terminal modification efficiency | 0 | 70 | 0 | 7 | 17 | 40 |

TABLE 8-continued

| | | | | | | |
|---|---|---|---|---|---|---|
| Mw/Mn | 1.78 | 1.8 | 2.21 | 2.19 | 2.2 | 2.19 |
| Catalyst (Fed amount mL) | A(3.75) | A(3.75) | A(1.56) | A(1.56) | A(1.56) | A(1.56) |
| Monomer solution concentration (weight %) | 12 | 12 | 5 | 5 | 5 | 5 |
| Polymerization temperature (° C.) | 50 | 50 | 10 | 10 | 10 | 10 |
| Polymerization time (h) | 1.5 | 1.5 | 3.5 | 3.5 | 3.5 | 3.5 |
| Modifier (mM) | 0 | 0.425 | 0 | 0.002 | 0.004 | 0.008 |
| Crack resistance index | 100 | 98 | 209 | 208 | 212 | 205 |
| Low-loss index | 100 | 122 | 102 | 104 | 110 | 118 |

| | Example 18 | Example 19 | Example 20 | Example 21 | Example 22 | Comparative Example 15 |
|---|---|---|---|---|---|---|
| Modifier | Azip | Azip | Azip | Azip | Azip | DEAB |
| Cis content % | 98.22 | 99.00 | 99.05 | 97.56 | 95.75 | 97.12 |
| Vinyl content % | 0.26 | 0.15 | 0.18 | 0.28 | 0.4 | 1.32 |
| Terminal modification efficiency | 95 | 17 | 95 | 80 | 76 | 72 |
| Mw/Mn | 2.22 | 2.3 | 2.25 | 2.3 | 2.26 | 3.82 |
| Catalyst (Fed amount mL) | A(1.56) | B(1.56) | B(1.56) | A(3.75) | A(3.75) | D(2.53) |
| Monomer solution concentration (weight %) | 5 | 5 | 5 | 12 | 12 | 20 |
| Polymerization temperature (° C.) | 10 | 10 | 10 | 10 | 50 | 60 |
| Polymerization time (h) | 3.5 | 4 | 4 | 4 | 1 | 1 |
| Modifier (mM) | 0.425 | 0.004 | 0.425 | 0.425 | 0.425 | 0.425 |
| Crack resistance index | 216 | 241 | 239 | 173 | 99 | 108 |
| Low-loss index | 136 | 111 | 138 | 131 | 129 | 122 |

Azip: Trimethylolpropane tris[3-(1-aziridinyl)propionate]

Table 8 shows the following results.

The polymers of Examples 16 to 22 exhibit superior crack resistance index and low-loss index to polymers of Comparative Examples 11 to 14. The polymer of Comparative Example 12, which as a high modification efficiency of 70%, exhibits low crack resistance regardless of excellent low-loss index.

Examples 23 to 25 and Comparative Examples 16 to 18

Rubber compositions were prepared using polymers of Examples 23 to 25 and Comparative Examples 16 to 18, which were prepared through Production Example 33, according to the formulation of Composition 1 shown in Table 1. Each rubber composition was vulcanized at 160° C. for 15 minutes to measure abrasion resistance and low-loss index as mechanical properties of the vulcanized rubber. The results are shown in Table 9.

TABLE 9

| | Comparative Example 16 | Example 23 | Comparative Example 17 | Example 24 | Comparative Example 18 | Example 25 |
|---|---|---|---|---|---|---|
| Modifier | DCNQ | DCNQ | BEABA | BEABA | c-MDI | c-MDI |
| Cis content % | 96.88 | 98.11 | 95.03 | 98.12 | 95.09 | 98.07 |
| Vinyl content % | 1.26 | 0.18 | 1.33 | 0.22 | 1.35 | 0.25 |
| Terminal modification efficiency | 23 | 75 | 26 | 75 | 26 | 75 |
| Mw/Mn | 2.71 | 2.16 | 2.21 | 2.21 | 2.24 | 2.09 |
| Catalyst (Fed amount mL) | E(3.75) | A(1.56) | E(3.75) | A(1.56) | ε(3.75) | A(1.56) |

TABLE 9-continued

|  | Comparative Example 16 | Example 23 | Comparative Example 17 | Example 24 | Comparative Example 18 | Example 25 |
|---|---|---|---|---|---|---|
| Monomer solution concentration (weight %) | 12 | 5 | 12 | 5 | 12 | 5 |
| Polymerization temperature (° C.) | 60 | 10 | 70 | 10 | 70 | 10 |
| Polymerization time (h) | 1 | 3.5 | 1 | 3.5 | 1 | 3.5 |
| Modifier (mM) | 0.425 | 0.425 | 0.425 | 0.425 | 0.425 | 0.425 |
| Crack resistance index | 100 | 195 | 94 | 201 | 101 | 205 |
| Low-loss index | 100 | 130 | 95 | 118 | 105 | 132 |

[Remarks]
BEABA: diethylaminobenzaldehyde
c-MDI: "Millionate MR-400" made by Nippon Polyurethane Industry Co. Ltd.

Table 9 shows the following results.

Examples 23 to 25, which have a high cis content of 98% or more and a high modification efficiency of 75%, superior crack resistance and low-loss index, compared to corresponding Comparative Examples.

Examples 26 and 27 and Comparative Examples 19 to 21

Rubber compositions were prepared using polymers of Examples 26 to 27 and Comparative Examples 16 to 18, which were prepared through Production Example 33, according to the formulation of Composition 4 (silica) shown in Table 10. Each rubber composition was vulcanized at 160° C. for 15 minutes to measure abrasion resistance and low-loss index as mechanical properties of the vulcanized rubber. The results are shown in Table 11.

TABLE 10

(Composition 4)

| First Step (Parts by mass) | Diene polymer polybutadiene (BR) | 50.0 |
|---|---|---|
|  | Natural rubber (NR) | 50.0 |
|  | Silica | 55.0 |
|  | Stearic acid | 2.0 |
|  | Coupling agent | 5.5 |
|  | Aromatic oil | 10.0 |
|  | Antioxidant (6C) | 1.0 |

TABLE 10-continued (Composition 4)

| Second Step (parts by mass) | Zinc oxide | 3.0 |
|---|---|---|
|  | Vulcanization accelerator (DPG) | 1.0 |
|  | Vulcanization accelerator (DM-P) | 1.0 |
|  | Vulcanization accelerator (NS) | 1.0 |
|  | Sulfur | 1.5 |

[Remarks]
Silica: silica AQ made by Tosoh Corporation
Silane coupling agent: "Si69" made by Degussa

TABLE 11

|  | Comparative Example 19 | Example 26 | Comparative Example 20 | Example 27 | Comparative Example 21 |
|---|---|---|---|---|---|
| Modifier 1 | GPMOS | GPMOS | GPMOS | GPMOS | DEAB |
| Modifier 2 |  |  | TEOSI | TEOSI |  |
| Cis content % | 93.49 | 98.01 | 93.01 | 98.09 | 97.12 |
| Vinyl content % | 1.16 | 0.31 | 1.23 | 0.26 | 1.32 |
| Terminal modification efficiency | 65 | 75 | 65 | 75 | 72 |
| Mw/Mn | 1.81 | 2.20 | 1.85 | 2.18 | 3.82 |
| Catalyst (Fed amount mL) | A(3.75) | A(1.56) | A(3.75) | A(1.56) | D(2.53) |
| Monomer solution concentration (weight %) | 12 | 5 | 12 | 5 | 20 |
| Polymerization temperature (° C.) | 50 | 10 | 50 | 10 | 60 |
| Polymerization time (h) | 1.5 | 3.5 | 1.5 | 3.5 | 1 |
| Modifier 1(mmol) | 0.425 | 0.425 | 0.425 | 0.425 | 0.425 |
| Modifier 2(mmol) |  | 0.425 | 0.425 | 0.425 |  |
| Crack resistance index | 100 | 221 | 98 | 218 | 165 |
| Low-loss index | 100 | 110 | 105 | 116 | 102 |

[Remarks]
GPMOS: 3-glycidoxypropyltrimethoxysilane
TEOSI: N-(3-triethoxysilylpropyl)-4,5-dihydroimidazole Table 11 shows the following results.

Examples 26 and 27, which have a high cis content of 98% or more and a high modification efficiency of 75%, superior crack resistance and low-loss index, compared to corresponding Comparative Examples.

In the polymer prepared by the secondary modification and condensation of Example 26, the excess increase in the Mooney Viscosity of the polymer can be suppressed, resulting in a significant improve in processability of unvulcanized rubber composition, although no data is disclosed. Both the rubber composition containing silica and the rubber composition containing carbon black exhibits high interaction with silica and carbon black, respectively, and the corresponding vulcanized rubber compositions exhibit satisfactory compatibility between failure characteristics, high abrasion resistance, and low heat buildup. Furthermore, cold flow resistance of the diene copolymer is also improved.

Examples 28 and 29 and Comparative Example 22

Rubber compositions were prepared using polymers of Examples 28 and 29 and Comparative Example 22, which were prepared through Production Examples 32 and 33, according to the formulation of Composition 5 shown in Table 12. Each rubber composition was vulcanized at 160° C. for 15 minutes to measure abrasion resistance and low-loss index as mechanical properties of the vulcanized rubber. The results are shown in Table 13.

TABLE 12

(Composition 5)

| | | |
|---|---|---|
| First Step | Diene polymer polybutadiene (BR) | 50.0 |
| (Parts by mass) | Natural rubber (NR) | 50.0 |
| | Carbon black SAF | 55.0 |
| | Stearic acid | 2.0 |
| | Antioxidant Suntight A | 2.0 |
| | Antioxidant (6C) | 1.0 |
| Second Step | Zinc oxide | 2.5 |
| (parts by mass) | Vulcanization accelerator (D-G) | 0.2 |
| | Vulcanization accelerator (DM-P) | 0.2 |
| | Vulcanization accelerator (NS-P) | 0.5 |
| | Sulfur | 1.3 |

[Remarks]
Carbon black SAF: SEAST 9H made by Tokai Carbon Co. Ltd.

TABLE 13

| | Comparative Example 22 | Example 28 | Example 29 |
|---|---|---|---|
| Modifier | DEAB | DEAB | DEAB |
| Cis content % | 93.1 | 98.04 | 95.72 |
| Vinyl content % | 5.41 | 0.21 | 0.42 |
| Terminal modification efficiency | 95 | 95 | 77 |
| Mw/Mn | 1.08 | 2.28 | 2.28 |
| Catalyst (Fed amount mL) | D | A (1.56) | A (3.75) |
| Monomer solution concentration (weight %) | 25 | 5 | 12 |
| Polymerization temperature (° C.) | 30 | 10 | 30 |
| Polymerization time (h) | 0.5 | 3.5 | 2.8 |
| Modifier (mM) | 0.425 | 0.425 | 0.425 |
| Crack resistance index | 100 | 133 | 117 |

Table 13 shows the following results.

Examples 28 and 29, which have a high cis content and a low vinyl content, exhibit improved crack resistance compared to Comparative Example.

INDUSTRIAL APPLICABILITY

Since the modified conjugated diene polymer of the present invention is a polymer that is modified a compound highly interactive with carbon black, silica, and other inorganic fillers and has a significantly high cis-1,4 bond content or a polymer that has significantly high modification efficiency, it provides a rubber composition suitable for tire exhibiting low heat build-up, satisfactory failure characteristics, and high abrasion resistance, and a tire comprising this rubber composition and having these characteristics.

The invention claimed is:

1. A modified conjugated diene polymer that is prepared by polymerization of a conjugated diene compound using a catalyst containing a lanthanoid rare earth element compound in an organic solvent and then modifying the resulting polymer having an active organic metal site with a modifier, wherein the modification efficiency is not less than 15% and the cis-1,4 bond content in the conjugated diene moiety measured by Fourier transform infrared spectroscopy satisfies the relationship (I):

$$\text{cis-1,4 bond content} \geq 98.00 (\%) \tag{I},$$

or the modification efficiency is not less than 75% and the cis-1,4 bond content in the conjugated diene moiety measured by Fourier transform infrared spectroscopy satisfies the relationship (II):

$$94.00(\%) \leq \text{cis-1,4 bond content} < 98.00(\%) \tag{II}.$$

2. The modified conjugated diene polymer according to claim 1, wherein in the modified polymer prepared by modification of the polymer having the active organic metal site, the modification efficiency is not less than 40% and the cis-1,4 bond content in the conjugated diene moiety measured by Fourier transform infrared spectroscopy satisfies the relationship (I):

$$\text{cis-1,4 bond content} \geq 98.00 (\%) \tag{I},$$

or the modification efficiency is not less than 75% and the cis-1,4 bond content in the conjugated diene moiety measured by Fourier transform infrared spectroscopy satisfies the relationship (II):

$$94.00 (\%) \leq \text{cis-1,4 bond content} < 98.00(\%) \tag{II}.$$

3. The modified conjugated diene polymer according to claim 1, wherein in the modified polymer prepared by modification of the polymer having the active organic metal site, the modification efficiency is not less than 40% and the cis-1,4 bond content in the conjugated diene moiety measured by Fourier transform infrared spectroscopy satisfies the relationships (I) and (III):

$$\text{cis-1,4 bond content} \geq 98.00(\%) \tag{I},$$

$$\text{vinyl bond content} \leq 0.75 \times (\text{cis-1,4 bond content}) - 73.25 \ (\%) \tag{III},$$

or the modification efficiency is not less than 75% and the cis-1,4 bond content in the conjugated diene moiety measured by Fourier transform infrared spectroscopy satisfies the relationship (II):

$$94.00 \ (\%) \leq \text{cis-1,4 bond content} < 98.00(\%) \tag{II}.$$

4. The modified conjugated diene polymer according to claim 1, wherein the microstructure measured by the Fourier transform infrared spectroscopy satisfies the relationships (I) and (IV):

$$\text{cis-1,4 bond content} \geq 98.00(\%) \tag{I},$$

$$\text{vinyl bond content} \leq 0.35 \tag{IV}.$$

5. The modified conjugated diene polymer according to claim 1, wherein the polymer having the active organic metal site is a terminally active polymer.

6. The modified conjugated diene polymer according to claim 1, wherein the polymer having the active organic metal site is allowed to react with a compound (modifier) having a functional group capable of substitution or addition reaction with the active organic metal site and not containing an active proton that deactivates the active organic metal site, thereby the functional group is incorporated or the molecular weight is increased by coupling.

7. The modified conjugated diene polymer according to claim 6, wherein the modifier has at least one functional group selected from the group consisting of an azacyclopropane group, ketone groups, carboxyl groups, thiocarboxyl groups, carbonates, carboxylic anhydrides, carboxylic acid metal salts, acid halides, urea groups, thiourea groups, amido groups, thioamido groups, isocyanate groups, thioisocyanate groups, haloisocyano groups, epoxy groups, thioepoxy groups, imino groups, and a M-Z bond (where M is Sn, Si, Ge, or P, and Z is a halogen atom) and contains no active proton nor onium salt that deactivates the active organic metal site.

8. The modified conjugated diene polymer according to claim 6, wherein the modifier is at least one compound (a) represented by the general formula (V):

[Chemical Formula 1]

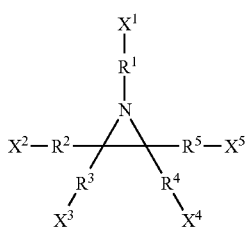

(V)

where $X^1$ to $X^5$ each represent a hydrogen atom or a monovalent functional group containing at least one selected from the group consisting of a halogen atom, carbonyl groups, thiocarbonyl groups, isocyanate groups, thioisocyanate groups, epoxy groups, thioepoxy groups, halosilyl groups, hydrocarbyloxysilyl groups, and sulfonyloxy groups, and containing no active proton nor onium salt; $X^1$ to $X^5$ may be the same or different with proviso that at least one of $X^1$ to $X^5$ is not a hydrogen atom; $R^1$ to $R^5$ independently represent a single bond or a divalent hydrocarbon group having 1 to 18 carbon atoms; and a plurality of aziridine rings may be bonded via any of $X^1$ to $X^5$ and $R^1$ to $R^5$.

9. The modified conjugated diene polymer according to claim 8, wherein the compound (a) does not simultaneously satisfy $X^1$=hydrogen atom and $R^1$=single bond in the general formula (V).

10. The modified conjugated diene polymer according to claim 1, wherein the modifier is at least one selected from the following compounds (b) to (h);

compound (b): a halogenated organic metal compound, metal halide compound, or organic metal compound represented by $R^6nM'Z_{4-n}$, $M'Z_4$, $M'Z_3$, $R^7nM'(—R^8—COOR^9)_{4-n}$, or $R^7nM'(—R^8—COR^9)_{4-n}$, where $R^6$ to $R^8$ may be the same or different and are each a hydrocarbon group containing 1 to 20 carbon atoms; $R^9$ is a hydrocarbon group containing 1 to 20 carbon atoms and optionally containing a carbonyl or ester group on a side chain; M' is a tin, silicon, germanium, or phosphorus atom; Z is a halogen atom; and n is an integer of 0 to 3;

compound (c): a heterocumulene compound containing a Y=C=Y' bond (where Y is a carbon, oxygen, nitrogen, or sulfur atom; and Y' is an oxygen, nitrogen, or sulfur atom) in the molecule;

compound (d): a heterotricyclic compound having a bond represented by the general formula (VI):

[Chemical Formula 2]

(VI)

(where Y' is an oxygen or sulfur atom) in the molecule;
compound (e): a haloisocyano compound;
compound (f): a carboxylic acid, acid halide, ester, carbonic ester, or acid anhydride represented by $R^{10}$—(COOH)m, $R^{11}(COZ)m$, $R^{12}$—(COO—$R^{13}$), $R^{14}$—OCOO—$R^{15}$, $R^{16}$—(COOCO—$R^{17}$)m, or general formula (VII):

[Chemical Formula 3]

(VII)

(where $R^{10}$ to $R^{18}$ may be the same or different and are each a hydrocarbon group containing 1 to 50 carbon atoms; Z is a halogen atom; and m is an integer of 1 to 5;

compound (g): a carboxylic acid metal salt represented by $R^{19}{}_kM''(OCOR^{20})_{4-k}$, $R^{21}{}_kM''(OCO—R^{22}—COO R^{23})_{4-k}$, or general formula (VIII):

[Chemical Formula 4]

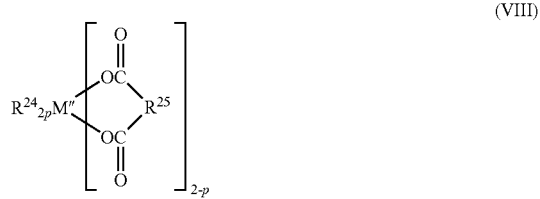

(VIII)

(where $R^{19}$ to $R^{25}$ may be the same or different and are each a hydrocarbon group containing 1 to 20 carbon atoms; M'' is a tin, silicon, or germanium atom; and k is an integer of 0 to 3); and compound (h): an N-substituted aminoketone, an N-substituted aminothioketone, an N-substituted aminoaldehyde, an N-substituted aminothioaldehyde, or a compound having a —C-(=M)-N<bond (M represents an oxygen or sulfur atom) in the molecule.

11. The modified conjugated diene polymer according to claim 1, wherein the modifier (i) is at least one selected from hydrocarbyloxysilane compounds represented by the general formula (IX):

[Chemical Formula 5]

(IX)

(where $A^1$ is a monovalent group having at least one functional group selected from the group consisting of (thio)epoxies, (thio)isocyanates, (thio)ketones, (thio)aldehydes, imines, amides, trihydrocarbyl isocyanurate esters, (thio)carboxylic esters, alkali metal salts or alkaline earth metal salts of (thio)carboxylic esters, carboxylic anhydrides, carboxylic halides, and dihydrocarbyl carbonate esters; $R^{26}$ is a single bond or a divalent inactive hydrocarbon group; $R^{27}$ and $R^{28}$ independently represent a monovalent aliphatic hydrocarbon group having 1 to 20 carbon atoms or a monovalent aromatic hydrocarbon group having 6 to 18 carbon atoms; n is an integer of 0 to 2; if a plurality of $OR^{28}$'s are present, $OR^{28}$'s may be the same or different; and an active proton or onium salt is not contained in the molecule) and partial condensates thereof.

12. The modified conjugated diene polymer according to claim 11, where the modifier (i) comprises a hydrocarbyloxysilane compound represented by the general formula (IX) and a hydrocarbyloxysilane compound represented by the general formula (X):

[Chemical Formula 6]

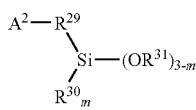
(X)

[where $A^2$ is a monovalent group having at least one functional group selected from cyclic tertiary amines, acyclic tertiary amines, pyridine, sulfides, multisulfides, and nitriles; $R^{29}$ is a single bond or a divalent inactive hydrocarbon group; $R^{30}$ and $R^{31}$ independently represent a monovalent aliphatic hydrocarbon group having 1 to 20 carbon atoms or a monovalent aromatic hydrocarbon group having 6 to 18 carbon atoms; m is an integer of 0 to 2; if a plurality of $OR^{31}$'s are present, $OR^{31}$'s may be the same or different; and an active proton or onium salt is not contained in the molecule] and/or a partial condensate thereof.

13. The modified conjugated diene polymer according to claim 11, prepared by adding a condensation promoter during and/or after the first modification reaction with the hydrocarbyloxysilane compound of the modifier (i).

14. The modified conjugated diene polymer according to claim 11, wherein after the first modification of the active end with the hydrocarbyloxysilane compound I represented by the general formula (IX), the diene polymer is further allowed to react with another hydrocarbyloxysilane compound II comprising at least one selected from a hydrocarbyloxysilane compound represented by the general formula (X) and/or a partial condensate thereof and a hydrocarbyloxysilane compound represented by the general formula (XI):

[Chemical Formula 7]

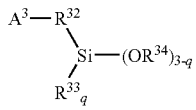
(XI)

(where $A^3$ is a monovalent group having at least one functional group selected from the group consisting of alcohols, thiols, primary amines and onium salts thereof, cyclic secondary amines and onium salts thereof, acyclic secondary amines and onium salts thereof, onium salts of cyclic tertiary amines, onium salts of acyclic tertiary amines, a group having an allyl or benzyl Sn bond, sulfonyl, sulfinyl, and nitrile; $R^{32}$ is a single bond or a divalent inactive hydrocarbon group; $R^{33}$ and $R^{34}$ independently represent a monovalent aliphatic hydrocarbon group having 1 to 20 carbon atoms or a monovalent aromatic hydrocarbon group having 6 to 18 carbon atoms; q is an integer of 0 to 2; and if a plurality of $OR^{34}$'s are present, $QR^{34}$'s may be the same or different) and/or a partial condensate thereof in the presence of a condensation promoter.

15. The modified conjugated diene polymer according to claim 14, wherein the condensation promoter comprises water and at least one compound selected from the group consisting of metal compounds represented by following items (1) to (3):

(1) a tin (II) carboxylate having 3 to 30 carbon atoms

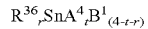

[where $R^{35}$'s are each an organic group having 2 to 19 carbon atoms and may be the same or different], (2) a tin (IV) compound represented by the following formula:

[where r is an integer of 1 to 3; t is an integer of 1 or 2; t+r is an integer of 3 or 4; $R^{36}$ is an aliphatic hydrocarbon group having 1 to 30 carbon atoms, $B^1$ is a hydroxyl group or halogen atom; $A^4$ is a siloxy group that is tri-substituted in total by [1] a carboxyl group having 2 to 30 carbon atoms, [2] an α,γ-dionyl group having 5 to 30 carbon atoms, [3] a hydrocarbyloxy group having 3 to 30 carbon atoms, and [4] a hydrocarbyl group having 1 to 20 carbons and/or a hydrocarbyloxy group having 1 to 20 carbons (may be the same or different); if a plurality of $A^4$'s are present, $A^4$'s may be the same or different], (3) a titanium (IV) compound represented by the following formula:

$$A^5{}_xTiB^2{}_{(4-x)}$$

[where x is an integer of 2 or 4; $A^5$ is [1] a hydrocarbyloxy group having 3 to 30 carbon atoms, [2] a siloxy group that is tri-substituted in total by an alkyl group having 1 to 30 carbon atoms and/or a hydrocarbyloxy group having 1 to 20 carbons; if a plurality of $A^5$'s are present, $A^5$'s may be the same or different; and $B^2$ is an α,γ-dionyl group having 5 to 30 carbon atoms].

16. The diene polymer according to claim 1, wherein the modifier (j) is at least one selected from compounds represented by the general formula (XII) or (XIII):

[Chemical Formula 5]

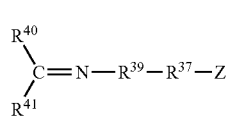
(XII)

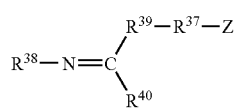
(XIII)

where Z is a substituent to react or interact with an organic or inorganic filler; $R^{37}$ is a single bond or a divalent organic group; $R^{38}$ is a monovalent organic group or a divalent organic group that forms a cyclic organic group together with $R^{39}$ or $R^{40}$; $R^{39}$ is a single bond, a divalent organic group, or a trivalent organic group that forms a cyclic organic group together with $R^{38}$, $R^{40}$, or $R^{41}$; $R^{40}$ is a monovalent organic group or a divalent organic group that forms a cyclic organic group together with $R^{38}$, $R^{39}$, or $R^{41}$; and $R^{41}$ is a monovalent organic group or a divalent organic group that forms a cyclic organic group together with $R^{38}$, $R^{39}$, or $R^{40}$, with the provision that each group bonded to the imino carbon is bonded via a carbon atom and $R^{37}$, $R^{38}$, $R^{39}$, $R^{40}$, $R^{41}$, and Z is a substituent that does not protonate a living polymer.

17. The modified conjugated diene polymer according to claim 16, wherein Z is an N,N-disubstituted aminophenyl group, imino group, or cyclic amino group.

18. The modified conjugated diene polymer according to claim 16, wherein the modifier (j) comprises dimethylaminobenzylidene ethylamine or diethylaminobenzylidene butylamine; dimethylaminobenzylidene aniline, dimethyl-aminobenzylidene n-butylaniline, dimethylaminobenzylidene dodecylaniline, dimethylaminobenzylidene metoxyaniline, dimethylaminobenzylidene dimethylaminoaniline, bis(dimethylamin.ophenyl)methylidene butylamine, bis(dimethylaminophenyl)methylidene n-octylamine, bis(diethylaminophenyl)methylidene butylamine, bis(diethylaminophenyl)-methylidene n-octylamine, benzylidene dimethylaminoaniline, methoxybenzylidene dimethylaminoaniline, 1-methyl-4-penten-2-yl-methylidene dimethylaniline, 1,3-dimethylbutylidene dimethylaniline, or a mixture thereof; or phenylene bis(dimethyl-aminobenzylidene amine); benzylidene (1-hexamethyleneimino) aniline, benzylidene (1-pyrrolidino)aniline, dimethylaminobenzylidene (1-hexamethyleneimino)aniline, dimethylaminobenzylidene (1pyrrolidino)aniline, (1-hexamethyleneimino)benzylidene aniline, (1-pyrrolidino)bernzylidene aniline, benzylidene ((4-n-butyl-1-piperazino)methyl)aniline, benzylidene ((3-(1-methyl)pyrrolidino)methyl) aniline, ((4-n-butyl-1-piperazino)methyl)-benzylidene aniline, ((3-(1-methyl)pyrrolidino)methyl)benzylidene aniline, or a mixture thereof.

19. The modified conjugated diene polymer according to claim 1, prepared by polymerizing a monomer comprising a conjugated diene at a temperature of 25° C. in the presence of a catalyst system comprising:
component (A): a lanthanoid rare earth element compound of atomic number 57 to 71 in the periodic table or a reaction product thereof with a Lewis base,
component (B): an organic aluminum compound represented by $AlR^{42}R^{43}R^{44}$ where $R^{42}$ and $R^{43}$ may be the same or different, and are each a hydrocarbon group having 1 to 10 carbon atoms or a hydrogen atom; $R^{44}$ is a hydrocarbon group having 1 to 10 carbon atoms; and $R^{42}$ may be the same or different from $R^{43}$ or $R^{44}$), and
component (C): at least one of a Lewis acid, a complex of a metal halide with a Lewis base, and an organic compound containing active halogen.

20. The modified conjugated diene polymer according to claim 19, wherein the lanthanoid rare earth element compound in the component (A) is a neodymium salt soluble in a hydrocarbon solvent.

21. The modified conjugated diene polymer according to claim 20, wherein the lanthanoid rare earth element compound in the component (A) is a neodymium branched carboxylate salt or a reaction product of the salt with a Lewis base.

22. The modified conjugated diene polymer according to claim 19, wherein the catalyst system further comprises aluminoxane as the component (D).

23. The modified conjugated diene polymer according to claim 22, wherein the catalyst system is preliminarily prepared in the presence of components (A), (B), (C), and (D), and the conjugated diene.

24. The modified conjugated diene polymer according to claim 1, wherein the ratio (Mw/Mn) of the weight average molecular weight (Mw) to the number average molecular weight (Mn) is in the range of 1.6 to 3.5.

25. The modified conjugated diene polymer according to claim 1, comprising 80 to 100 mass percent of 1,3-butadiene monomer unit and 20 to 0 mass percent of another monomer unit copolymerizable with 1,3-butadiene.

26. The modified conjugated diene polymer according to claim 25, consisting of the 1,3-butadiene monomer unit.

27. The modified conjugated diene polymer according to claim 1, wherein the number average molecular weight (Mn) is in the range of 100,000 to 500,000.

28. The modified conjugated diene polymer according to claim 27, wherein the number average molecular weight (Mn) is in the range of 150,000 to 300,000.

29. A rubber composition comprising the modified conjugated diene polymer according to claim 1 in an amount of at least 10 mass percent of the entire rubber component.

30. The rubber composition according to claim 29, further comprising a filler in an amount of at least 10 parts by mass based on 100 parts by mass of rubber component.

31. The rubber composition according to claim 29, being sulfur-crosslinkable.

32. A tire comprising the rubber composition according to claim 29.

* * * * *